(12) United States Patent
Otsuka

(10) Patent No.: US 11,762,643 B2
(45) Date of Patent: Sep. 19, 2023

(54) SYSTEM USING BLOCKCHAIN

(71) Applicant: NOMURA RESEARCH INSTITUTE, LTD., Tokyo (JP)

(72) Inventor: Shinichiro Otsuka, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 17/617,497

(22) PCT Filed: Feb. 14, 2020

(86) PCT No.: PCT/JP2020/005838
§ 371 (c)(1),
(2) Date: Dec. 8, 2021

(87) PCT Pub. No.: WO2020/255483
PCT Pub. Date: Dec. 24, 2020

(65) Prior Publication Data
US 2022/0253294 A1    Aug. 11, 2022

(30) Foreign Application Priority Data

Jun. 17, 2019  (JP) .............................. JP2019-112105

(51) Int. Cl.
*G06F 21/62*   (2013.01)
*G16B 30/10*   (2019.01)
(Continued)

(52) U.S. Cl.
CPC ..................................... *G06F 8/60* (2013.01)

(58) Field of Classification Search
CPC . G06F 8/60; G06F 8/71; G06F 21/602; G06F 21/64; G06F 16/27; G06F 8/65;
(Continued)

(56) References Cited

U.S. PATENT DOCUMENTS 10,348,488 B1 * 7/2019 Paczkowski .......... H04L 9/0643
11,593,512 B2 * 2/2023 Zhang ................... G06F 21/602
(Continued)

FOREIGN PATENT DOCUMENTS

JP       2009-230458 A    10/2009
JP       2011-65495 A     3/2011
(Continued)

OTHER PUBLICATIONS

International Search Report (ISR) dated May 26, 2020 filed in PCT/JP2020/005838.
(Continued)

*Primary Examiner* — Thuy Dao
(74) *Attorney, Agent, or Firm* — Rankin, Hill & Clark LLP

(57) ABSTRACT

A system is a system for managing release of a developed program to a production environment, and includes a plurality of servers in which a blockchain is installed, a means for detecting an event related to release of a program, and a means for generating a block of the blockchain, which contains uniqueness information that assures uniqueness of the program when the event was detected, and specification information that specifies the detected event.

6 Claims, 26 Drawing Sheets

(51) Int. Cl.
*H04L 29/06* (2006.01)
*H04L 9/06* (2006.01)
*G06F 8/71* (2018.01)
*G06F 16/23* (2019.01)
*G06F 8/60* (2018.01)

(58) Field of Classification Search
CPC ... G06Q 10/101; H04L 9/3239; H04L 63/126; H04L 9/3247; H04L 9/3297; H04L 9/0637; H04L 9/0643; G05B 19/042
See application file for complete search history.

(56) References Cited

U.S. PATENT DOCUMENTS

| | | | | |
|---|---|---|---|---|
| 2013/0227585 | A1* | 8/2013 | Ichikawa | G06F 9/505 718/104 |
| 2019/0305959 | A1* | 10/2019 | Reddy | H04L 9/006 |
| 2021/0075623 | A1* | 3/2021 | Petersen | H04L 9/50 |

FOREIGN PATENT DOCUMENTS

| | | |
|---|---|---|
| JP | 5253336 B2 | 7/2013 |
| JP | 2019-29019 A | 2/2019 |

OTHER PUBLICATIONS

Pourmajidi et al., "Logchain: Blockchain-assisted Log Storage", IEEE Computer Society, 2018 IEEE 11th International Conference on Cloud Computing, 2018, ISSN:2159-6190, DOI: 10.1109/CLOUD. 2018.00150, pp. 978-982, in particular, see "III. LCaaS"; Cited in ISR.

Kosakatani et al., "Anti-Tampering System using Blockchain Technology for e-Evidence on Criminal Procedure", Information Processing Society of Japan, IPSJ SIG Technical Reports, 2018, vol. 2018-SPT-31, No. 16, pp. 1-8, Total 10 pages; Cited in ISR.

* cited by examiner

FIG. 5

| USER ID | NAME | MAIL ADDRESS | MANAGERIAL POSITION |
|---|---|---|---|
| "NRI_001" | "OTSUKA HAJIME" | xxxxxxxxx@xxx.co.jp | DEVELOPER |
| "NRI_011" | "OTSUKA JIROU" | yyyyyyyy@xxx.co.jp | APPROVER |
| "NRI_111" | "SYSTEM COMMAND TO DMZ" | zzzzzzzzz@xxx.co.jp | LIBRARIAN |

TOP 10 RELEASE APPLICATION COUNTS ARE DISPLAYED
INPUT NUMBER TO INCREASE COUNTS TO BE DISPLAYED

DISPLAY [ ] COUNTS

| PROGRAM NAME | RELEASE APPLICATION COUNT |
|---|---|
| KAIKEI_01 | 10,000 |
| KAIKEI_02 | 9,900 |
| KAIKEI_03 | 800 |
| ⋮ | RETURN |

TOP 10 PRODUCTION APPLICATION DELAY COUNTS ARE DISPLAYED

DISPLAY [ ] COUNTS

| PROGRAM NAME | PRODUCTION APPLICATION DELAY COUNT |
|---|---|
| KAIKEI_11 | 10 |
| KAIKEI_12 | 9 |
| KAIKEI_20 | 5 |
| ⋮ | RETURN |

| TOP 10 DEVELOPER CHANGE COUNTS ARE DISPLAYED |  |
|---|---|
| DISPLAY [ ] COUNTS | |
| PROGRAM NAME | DEVELOPER CHANGE COUNT |
| KAIKEI_32 | 100 |
| KAIKEI_31 | 76 |
| KAIKEI_40 | 16 |
| ⋮ | RETURN |

528

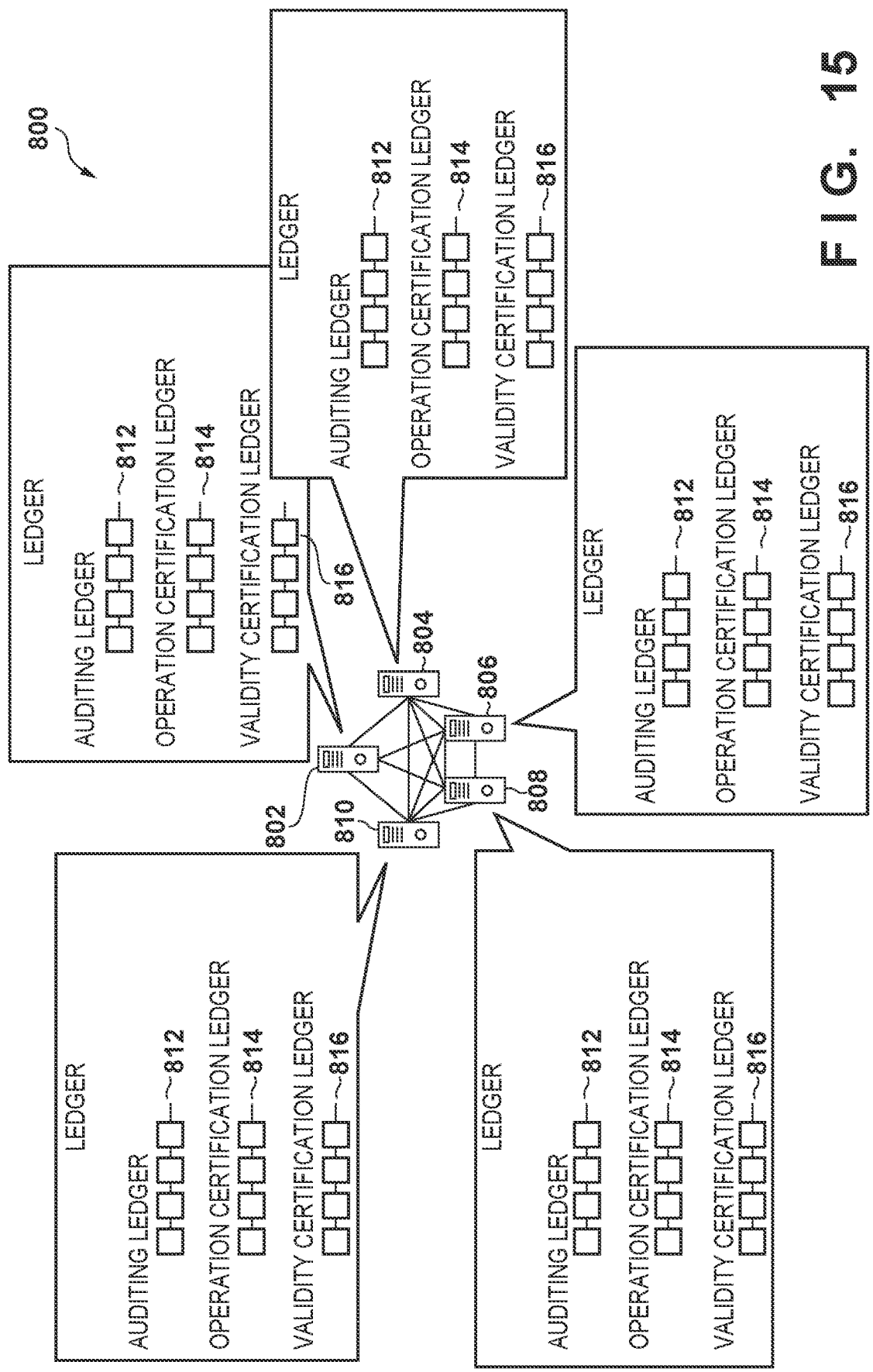
F I G. 15

FIG. 16B

| | | |
|---|---|---|
| Step 3 | (diagram with 802, 804, 806, 808, 810) | I. PERFORM ALIVE/DEAD CONFIRMATION ON OTHER SERVERS<br><br>IF NONRESPONDING SERVER IS FOUND, RETURN RECOVERY WORK APPROVAL AND SERVER NAME TO REQUEST SOURCE<br><br>IF THERE IS NO NONRESPONDING SERVER, RETURN REJECTION OF RECOVERY WORK TO REQUEST SOURCE |
| Step 4 | (diagram with 802, 804, 806, 808, 810) | I. REQUEST SOURCE ADDS UP RESPONSES FROM REQUEST-DESTINATION SERVERS (ADDITION TARGET IS ONLY FAILED SERVER FOUND BY REQUEST SOURCE)<br><br>IF ADOPTED BY MAJORITY DECISION, START RECOVERY WORK, AND GO TO Step 5<br><br>IF REJECTED BY MAJORITY DECISION, CANCEL RECOVERY WORK, HANDLE THIS EVENT AS DETECTION ERROR, AND RESUME ALIVE/ DEAD MONITORING PROGRAM |
| Step 5 | (diagram with 802, 804, 806, 808, 810, 818) | I. REQUEST SOURCE DISCONNECTS AND DELETES SPECIFIED FAILED SERVER, AND RECORDS FOLLOWING IN OPERATION CERTIFICATION LEDGER: DISCONNECTION TIME, NUMBER OF CONSTITUENT SERVERS, AND DISCONNECTED SERVER NAME REASON: FAILURE DISCONNECTION<br><br>II. REQUEST SOURCE FORMS DUPLICATE OF ITS OWN VIRTUAL MACHINE (SERVER NAME TAKES OVER DELETED SERVER NAME)<br><br>III. AFTER DUPLICATION IS COMPLETE, REQUEST SOURCE CAUSES DUPLICATE TO PARTICIPATE IN BLOCKCHAIN NETWORK, AND RECORDS FOLLOWING IN OPERATION CERTIFICATION LEDGER: RECOVERY TIME, NUMBER OF CONSTITUENT SERVERS, AND DISCONNECTED SERVER NAME REASON: RECOVERY COMPLETION<br><br>IV. REQUEST SERVER RESUMES ALIVE/ DEAD MONITORING PROGRAM (RESUMES FROM TIME CLOSEST TO CURRENT TIME) |

F I G. 17

| FIRING TIMING TABLE | NUMBER OF CONSTITUENT SERVERS:3 | NUMBER OF CONSTITUENT SERVERS:5 | NUMBER OF CONSTITUENT SERVERS:7 | NUMBER OF CONSTITUENT SERVERS:9 | NUMBER OF CONSTITUENT SERVERS:11 |
|---|---|---|---|---|---|
| WHEN 5 SEC PER MINUTE | ISSUE FROM SERVER NAME "1" | ISSUE FROM SERVER NAME "1" | ISSUE FROM SERVER NAME "1" | ISSUE FROM SERVER NAME "1" | ISSUE FROM SERVER NAME "1" |
| WHEN 10 SEC PER MINUTE | ISSUE FROM SERVER NAME "2" | ISSUE FROM SERVER NAME "2" | ISSUE FROM SERVER NAME "2" | ISSUE FROM SERVER NAME "2" | ISSUE FROM SERVER NAME "2" |
| WHEN 15 SEC PER MINUTE | ISSUE FROM SERVER NAME "3" | ISSUE FROM SERVER NAME "3" | ISSUE FROM SERVER NAME "3" | ISSUE FROM SERVER NAME "3" | ISSUE FROM SERVER NAME "3" |
| WHEN 20 SEC PER MINUTE | | ISSUE FROM SERVER NAME "4" | ISSUE FROM SERVER NAME "4" | ISSUE FROM SERVER NAME "4" | ISSUE FROM SERVER NAME "4" |
| WHEN 25 SEC PER MINUTE | ISSUE FROM SERVER NAME "1" | ISSUE FROM SERVER NAME "5" | ISSUE FROM SERVER NAME "5" | ISSUE FROM SERVER NAME "5" | ISSUE FROM SERVER NAME "5" |
| WHEN 30 SEC PER MINUTE | ISSUE FROM SERVER NAME "2" | | ISSUE FROM SERVER NAME "6" | ISSUE FROM SERVER NAME "6" | ISSUE FROM SERVER NAME "6" |
| WHEN 35 SEC PER MINUTE | ISSUE FROM SERVER NAME "3" | ISSUE FROM SERVER NAME "1" | ISSUE FROM SERVER NAME "7" | ISSUE FROM SERVER NAME "7" | ISSUE FROM SERVER NAME "7" |
| WHEN 40 SEC PER MINUTE | | ISSUE FROM SERVER NAME "2" | | ISSUE FROM SERVER NAME "8" | ISSUE FROM SERVER NAME "8" |
| WHEN 45 SEC PER MINUTE | ISSUE FROM SERVER NAME "1" | ISSUE FROM SERVER NAME "3" | ISSUE FROM SERVER NAME "1" | ISSUE FROM SERVER NAME "9" | ISSUE FROM SERVER NAME "9" |
| WHEN 50 SEC PER MINUTE | ISSUE FROM SERVER NAME "2" | ISSUE FROM SERVER NAME "4" | ISSUE FROM SERVER NAME "2" | | ISSUE FROM SERVER NAME "10" |
| WHEN 55 SEC PER MINUTE | ISSUE FROM SERVER NAME "3" | ISSUE FROM SERVER NAME "5" | ISSUE FROM SERVER NAME "3" | | ISSUE FROM SERVER NAME "11" |
| WHEN 60 SEC PER MINUTE | | | | | |

FIG. 18B

| | | |
|---|---|---|
| Step 3 | (diagram with nodes 802, 804, 806, 808, 810) | I. CONFIRM UTILIZATION RATES OF CPU AND MEMORY OF REQUEST-SOURCE SERVER<br><br>IF ONE OF UTILIZATION RATES IS 90% OR MORE, RETURN RESOURCE INCREASE APPROVAL TO REQUEST SOURCE / IF BOTH VALUES ARE LESS THAN 90%, RETURN REJECTION OF RESOURCE INCREASING WORK TO REQUEST SOURCE |
| Step 4 | (diagram with nodes 802, 804, 806, 808, 810) | I. REQUEST SOURCE ADDS UP RESPONSES FROM REQUEST-DESTINATION SERVERS<br><br>IF ADOPTED BY MAJORITY DECISION, START RESOURCE INCREASING WORK AND GO TO Step 5 / IF REJECTED BY MAJORITY DECISION, CANCEL RESOURCE INCREASING WORK, HANDLE THIS EVENT AS DETECTION ERROR, AND RESUME ALIVE MONITORING PROGRAM AND RESOURCE MONITORING PROGRAM |
| Step 5 | (diagram with nodes 802, 804, 806, 808, 810, 820, 822) | I. REQUEST SOURCE OBTAINS NUMBER OF CURRENT CONSTITUENT SERVERS FROM OPERATION CERTIFICATION LEDGER, AND INCREASES TWO SERVERS AT ONCE IF NUMBER DOES NOT REACH 11 AS MAXIMUM NUMBER<br><br>II. REQUEST SOURCE FORMS TWO DUPLICATES * OF ITS OWN VIRTUAL MACHINE (CONSECUTIVE NUMBERS ARE SET AS SERVER NAMES) *ODD NUMBER OF SERVERS ARE MAINTAINED AS TOTAL TO HOLD MAJORITY DECISION SYSTEM<br><br>III. AFTER DUPLICATION IS COMPLETE, REQUEST SOURCE CAUSES DUPLICATES TO PARTICIPATE IN BLOCKCHAIN NETWORK, AND RECORDS FOLLOWING IN OPERATION CERTIFICATION LEDGER: INCREASE TIME, NUMBER OF CONSTITUENT SERVERS, AND INCREASED SERVER NAMES REASON: NODE ADDITION<br><br>IV. REQUEST SOURCE RESUMES ALIVE/DEAD MONITORING PROGRAM AND RESOURCE MONITORING PROGRAM (RESUMES FROM TIME CLOSEST TO CURRENT TIME) |

FIG. 19B

| | | |
|---|---|---|
| Step 3 | 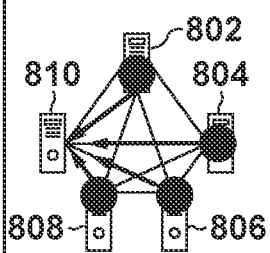 | I. CONFIRM UTILIZATION RATES OF CPU AND MEMORY OF REQUEST-SOURCE SERVER<br><br>IF ONE UTILIZATION RATE IS 5% OR LESS, RETURN RESOURCE REDUCTION APPROVAL TO REQUEST SOURCE<br><br>IF BOTH VALUES ARE > 5% AND < 90%, RETURN REJECTION OF RESOURCE REDUCING WORK TO REQUEST SOURCE |
| Step 4 | 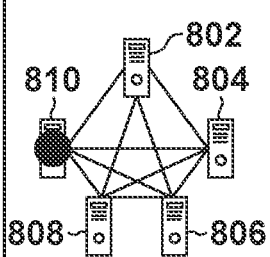 | I. REQUEST SOURCE ADDS UP RESPONSES FROM REQUEST-DESTINATION SERVERS<br><br>IF ADOPTED BY MAJORITY DECISION, START RESOURCE REDUCING WORK AND GO TO Step 5<br><br>IF REJECTED BY MAJORITY DECISION, CANCEL RESOURCE REDUCING WORK, HANDLE THIS EVENT AS DETECTION ERROR, AND RESUME ALIVE MONITORING PROGRAM AND RESOURCE MONITORING PROGRAM |
| Step 5 | 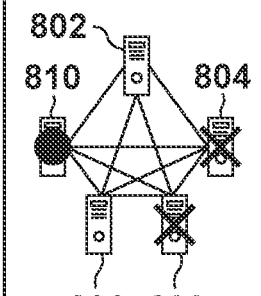 | I. REQUEST SOURCE OBTAINS NUMBER OF CURRENT CONSTITUENT SERVERS FROM OPERATION CERTIFICATION LEDGER, AND DELETES TWO SERVERS AT ONCE IF NUMBER DOES NOT REACH 3 AS MINIMUM NUMBER<br><br>II. REQUEST SOURCE DELETES SERVERS FROM THOSE HAVING LARGE NUMBERS AS SERVER NAMES<br><br>III. AFTER DELETION IS COMPLETE, REQUEST SOURCE RECORDS FOLLOWING IN OPERATION CERTIFICATION LEDGER: DELETION TIME, NUMBER OF CONSTITUENT SERVERS, AND DELETED SERVER NAMES REASON: NODE DELETION<br><br>IV. REQUEST SOURCE RESUMES ALIVE/ DEAD MONITORING PROGRAM AND RESOURCE MONITORING PROGRAM (RESUMES FROM TIME CLOSEST TO CURRENT TIME) |

FIG. 20A

| | TIME | NUMBER OF CONSTITUENT SERVERS | SERVER NAME | REASON (FAILURE DISCONNECTION = 1, RECOVERY COMPLETION = 2, NODE ADDITION = 3, NODE DELETION = 4) | STATE (NORMAL = 1, ABNORMAL = 2) |
|---|---|---|---|---|---|
| HASH VALUE OF PRECEDING BLOCK | "2018-09-19_16:30" | "5" | N/A | N/A | "1" |

| | TIME | NUMBER OF CONSTITUENT SERVERS | SERVER NAME | REASON (FAILURE DISCONNECTION = 1, RECOVERY COMPLETION = 2, NODE ADDITION = 3, NODE DELETION = 4) | STATE (NORMAL = 1, ABNORMAL = 2) |
|---|---|---|---|---|---|
| HASH VALUE OF PRECEDING BLOCK | "2018-09-19_15:05" | "4" | "NRI_005" | "1" | "2" |

| | TIME | NUMBER OF CONSTITUENT SERVERS | SERVER NAME | REASON (FAILURE DISCONNECTION = 1, RECOVERY COMPLETION = 2, NODE ADDITION = 3, NODE DELETION = 4) | STATE (NORMAL = 1, ABNORMAL = 2) |
|---|---|---|---|---|---|
| HASH VALUE OF PRECEDING BLOCK | "2018-09-19_15:10" | "5" | "NRI_005" | "2" | "2" |

| | | |
|---|---|---|
| Step 3 | 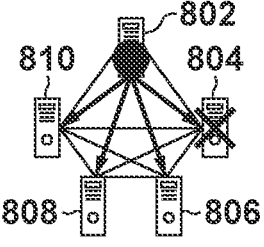 | I. COMPARE AND CONFIRM NUMBERS OF LINES AND FILE SIZES OF AUDITING-RELATED PROGRAM OF OTHER SERVERS<br><br>IF SERVER THAT MAY BE ALTERED IS FOUND, RETURN PROGRAM ALTERATION HANDLING WORK APPROVAL AND SERVER NAME TO REQUEST SOURCE     IF THERE IS NO SERVER THAT MAY BE ALTERED, RETURN REJECTION OF PROGRAM ALTERATION HANDLING WORK TO REQUEST SOURCE |
| Step 4 | 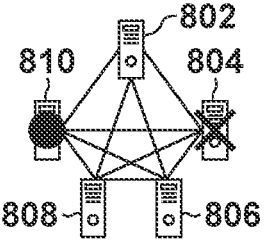 | I. REQUEST SOURCE ADDS UP RESPONSES FROM REQUEST-DESTINATION SERVERS (ADDITION TARGET IS ONLY SERVER THAT MAY BE ALTERED AND IS FOUND BY REQUEST SOURCE)<br><br>IF ADOPTED BY MAJORITY DECISION, START PROGRAM ALTERATION HANDLING WORK     IF REJECTED BY MAJORITY DECISION, CANCEL PROGRAM ALTERATION HANDLING WORK, HANDLE THIS EVENT AS DETECTION ERROR, AND RESUME ALIVE/DEAD MONITORING PROGRAM, RESOURCE MONITORING PROGRAM, AND ALTERATION MONITORING PROGRAM |
| Step 5 | 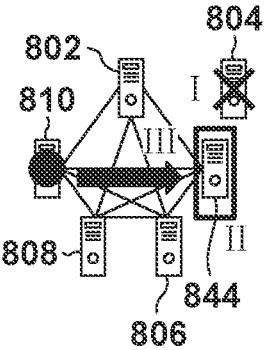 | I. REQUEST SOURCE DISCONNECTS AND DELETES SPECIFIED ALTERED SERVER AND RECORDS FOLLOWING IN VALIDITY CERTIFICATION LEDGER: DISCONNECTION TIME, NUMBER OF CONSTITUENT SERVERS, AND DISCONNECTED SERVER NAME REASON: ALTERATION DETECTION<br><br>II. REQUEST SOURCE FORMS DUPLICATE OF ITS VIRTUAL MACHINE (SERVER NAME TAKES OVER DELETED SERVER NAME)<br><br>III. AFTER DUPLICATION IS COMPLETE, REQUEST SOURCE CAUSES DUPLICATE TO PARTICIPATE IN BLOCKCHAIN NETWORK, AND RECORDS FOLLOWING IN VALIDITY CERTIFICATION LEDGER: RECOVERY TIME, NUMBER OF CONSTITUENT SERVERS, AND DISCONNECTED SERVER NAME REASON: RECOVERY COMPLETION<br><br>IV. REQUEST SOURCE RESUMES ALIVE/ DEAD MONITORING PROGRAM, RESOURCE MONITORING PROGRAM, AND ALTERATION MONITORING PROGRAM FOR AUDITING-RELATED PROGRAM (RESUMES FROM TIME CLOSEST TO CURRENT TIME) |

SYSTEM USING BLOCKCHAIN

TECHNICAL FIELD

The present invention relates to a system using a blockchain.

BACKGROUND ART

In the development of a large-scale system, a work of transferring many complete program modules to a production environment is essential, and this work naturally takes much labor and time. In addition, this work has become a hotbed for various human errors such as confusion of new and old versions. To improve a situation like this, the present applicant has proposed a program release management system described in PTL 1.

In this program release management system described in PTL 1, an approver accesses a development-side area of a network attached storage from an approver terminal, confirms that, for example, no unauthorized logic is mixed in a developed program file, and gives a librarian an approval for transferring the program file. In this case, the approver notifies the librarian of specific information such as the file name, file size, and timestamp of the program file.

The librarian having received this information accesses a transfer server, and checks, on the display of a librarian terminal, list information of program files stored in the development-side area. Then, the librarian specifies the approved program file based on the file name, the file size, and the timestamp, and issues a command requesting transfer.

As described above, an approver notifies a librarian of specific information of a program file stored in the development-side area, and the librarian selects the program file as a transfer target based on this information. This makes it possible to restrain a developer from making alterations including a change in file size or timestamp on the program file stored in the development-side area, within a short time from the timing immediately after the approval by the approver to the completion of transfer to a production-side area.

A librarian herein mentioned means a professional belonging to a third-party organization completely independent of a department to which a developer and an approver belong, and having no interest in the department. In the program release management system described in PTL 1, a librarian is secured in an organization, and internal control is assured by a program alteration check and application to a production environment.

CITATION LIST

Patent Literature

PTL 1: Japanese Patent No. 5253336
PTL 2: Japanese Patent Laid-Open No. 2019-029019

SUMMARY OF INVENTION

Technical Problem

Recently, systems are becoming larger in scale and more and more complicated, and the frequency of module update is also increasing, so the work amounts of librarians are increasing accordingly. Document check requires many persons because a plurality of librarians perform a multi-eye check. Since teaming or the like is performed to improve the operation rate of persons, the size of the librarian organization is increasing as well. At the time of auditing, an auditor visits an enterprise, enters a secret room, and checks trails on documents. Receiving this auditor, providing documents, and the like are also works of the librarian. In addition, although the contents of jobs of the librarians are relatively simple, no mistake can be allowed. This makes it difficult to maintain the motivation of persons.

Accordingly, systemization of librarians is being examined. PTL 1 describes a method of automating comparison of documents and issuing of transfer request commands by librarians. Since, however, librarians eventually perform final check, the method only supports the librarians. PTL 1 does not describe a concept of replacing librarians with a system.

When librarians are replaced with a system, monitoring by human eyes is no longer performed, so a measure for enhancing security must be performed. For example, it is necessary to control the possibility that a malicious developer alters a program stored in a development-side area during a period from the timing immediately after approval by an approver to the completion of transfer to a production-side area.

It is possible to assure security by comparing, before the system designates transfer, the file size and hash value of a program to be transferred with a file size and a hash value remaining in a log, which were obtained when the development of the file was complete or the file was approved. However, if the malicious developer rewrites the log as well, the system hardly detects the above alteration.

The present invention has been made in consideration of the above problem, and has as its object to provide a program release management technique capable of suppressing or removing an alternation by a malicious developer while saving manpower by implementing the functions of librarians by a system.

Solution to Problem

One aspect of the present invention relates to a system. This system is a system for managing release of a developed program to a production environment, and comprises a plurality of servers in which a blockchain is installed, means for detecting an event related to release of a program, and means for generating a block of the blockchain, which contains uniqueness information that assures uniqueness of the program when the event was detected, and specification information that specifies the detected event.

Note that arbitrary combinations of the constituent elements described above and constituent elements and expressions obtained by replacing the constituent elements and expressions of the present invention between an apparatus, a method, a system, a computer program, and a recording medium storing a computer program are also effective as aspects of the present invention.

Other features and advantages of the present invention will be apparent from the following explanation taken in conjunction with the accompanying drawings. Note that in the accompanying drawings, the same reference numerals designate the same or similar parts.

Advantageous Effects of Invention

According to the present invention, it is possible to suppress or remove an alteration by a malicious developer while saving manpower by implementing the function of an official responsible for administrative affairs, who is in charge of business workflow-based jobs and represented by a librarian, by a system using a blockchain.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a data structure view showing an example of a user information holding unit shown in FIG. 3;

FIG. 11 is a view showing a typical screen of a release application count confirmation screen;

FIG. 12 is a view showing a typical screen of a production application delay count confirmation screen;

FIG. 13 is a view showing a typical screen of a developer change count confirmation screen;

FIG. 15 is a schematic view of an auditing system according to the second embodiment;

FIG. 16B is a flowchart showing the procedure of processing of certification (requirement 1) indicating that no unauthorized work is performed at the time of server down;

FIG. 17 is a view showing an example of a firing timing;

FIG. 18B is a flowchart showing the procedure of processing of validity assurance (requirement 1) for cancellation of resource deficiency caused by CPU rise;

FIG. 19B is a flowchart showing the procedure of processing of validity assurance (requirement 1) for reduction after cancellation of resource deficiency caused by CPU rise;

FIG. 20A is a data structure view showing an example of an operation certification ledger shown in FIG. 15;

FIG. 21B is a flowchart showing the procedure of processing of certification (requirement 2) indicating that an auditing-related program is not unauthorizedly altered during operation;

DESCRIPTION OF EMBODIMENTS

Figure 1:
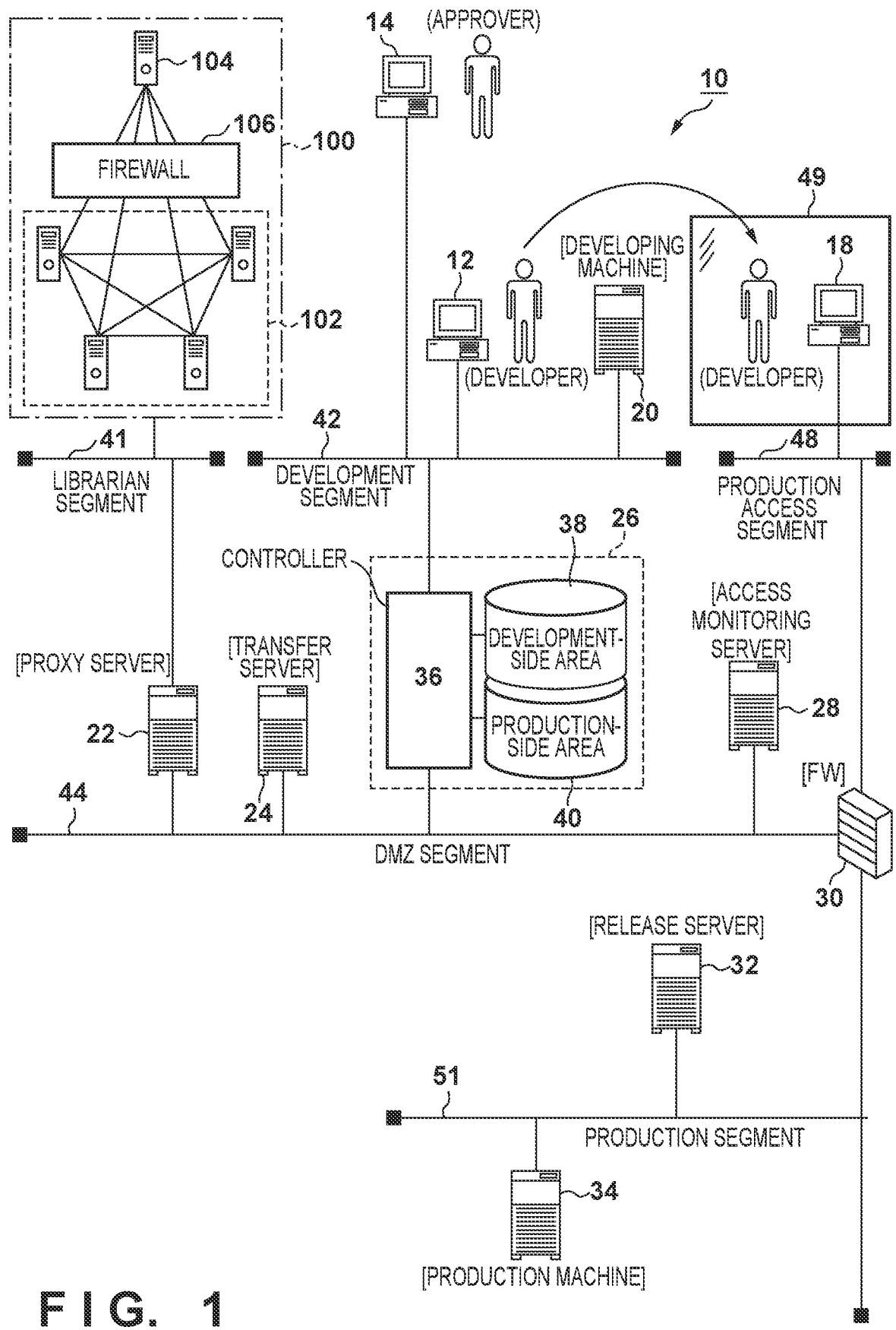
FIG. 1 is a schematic view showing the whole arrangement of a program management system including a librarian system according to the first embodiment of the present invention.

In the following explanation, the same reference numerals denote the same or equivalent constituent elements, members, and processes shown in the drawings, and a repetitive explanation thereof will be omitted as needed. Also, each drawing does not show some members that are not important for the explanation.

A distributed ledger technology also called a blockchain is known. The blockchain is a technique that collectively records data in nodes by a unit called a block, and distributedly manages the same block information. This technique is called a "blockchain" because blocks are connected to each other in a time-series manner.

The blockchain mainly has the following five features.

1. All Share Information

All nodes connected by the blockchain save the same data. When data is input to the blockchain, a node to which a block is initially added is determined. Although this determination depends on the design of the blockchain, general examples are proof of work (PoW) that performs determination in accordance with the calculation power, and PBFT by which a specific manager group performs determination. Then, the node to which a block is added sends the block to all other nodes. After all the nodes have verified the contents of the block, the block is added to each node if there is no problem. Consequently, the same data is saved in all nodes. If there is a problem, the block disappears, and only blocks having no problem are finally added. That is, only verified correct data is saved as a block.

2. Nonstop (Zero Downtime)

A computer playing the role of a leader exists in conventional systems, but the blockchain has no centralized node in many cases. In some blockchains, however, a node playing a central role exists. All nodes are equally connected to each other, and have exactly the same function. Even when some nodes have failed, therefore, if other nodes are normal, the whole blockchain does not stop, and all processes are continued.

3. Unalterability

In the blockchain, blocks are added in a time-series order. Even if past data is altered (changed), therefore, this alteration is not accomplished without changing all following data. All nodes verify the validity of data exchange. That is, each block stores a hash value containing information of an immediately preceding block. If data are different even slightly, the hash values become entirely different values, so no consistency can be obtained without altering all subsequent blocks. In addition, altered data is not saved as a correct block unless 51% or more of nodes perform the alteration in cooperation with each other. These mechanisms make alteration practically impossible.

4. Traceability

In the blockchain, unalterable (unchangeable) data found to be correct by all nodes is saved as a block. Also, data is not lost by redundancy. In addition, since data is stored in a time-series order, data in the past can be referred to, and this increases the traceability.

5. Low Cost

The blockchain can be constructed at low cost because database products and cluster products are unnecessary.

In consideration of the abovementioned features of the blockchain, the present inventor has uniquely found that the affinity between the blockchain and the system for replacing librarians is high. The present inventor has particularly found that a higher security required for the system can be achieved by managing the record of auditing for release of a developed program to a production environment by using the blockchain. When the auditing record is kept in the blockchain, no malicious developer can alter the record. Therefore, even if alteration is performed after approval, the system can easily detect the alteration by referring to the record on the blockchain.

First Embodiment

FIG. 1 is a schematic view showing the overall arrangement of a program management system 10 including a librarian system 100 according to the first embodiment. The program management system 10 includes the librarian system 100, a developer terminal 12 to be operated by a developer, an approver terminal 14 to be operated by an approver, a release terminal 18 to be operated by the developer, a developing machine 20 for holding and managing a business program being developed, a proxy server 22, a transfer server 24, a network attached storage (NAS) 26, an access monitoring server 28, a firewall 30, a release server 32, and a production machine 34 in which a developed business program is installed. The release terminal 18 is installed in a glazed release terminal room 49.

The network attached storage 26 includes a controller 36, a development-side area 38, and a production-side area 40. The controller 36 is implemented by a CPU of the network attached storage 26 when the CPU operates in accordance with an OS and a control program stored in a ROM or a RAM. The development-side area 38 and the production-side area 40 are, for example, hard disks, volatile memories, or nonvolatile memories mounted in the network attached storage 26, and logically partitioned by the controller 36. The development-side area 38 is connected to a development segment 42 via the controller 36. The production-side area 40 is connected to a DMZ (DeMilitarized Zone) segment 44 via the controller 36.

The librarian system 100 is installed on a librarian segment 41.

The developer terminal 12, the approver terminal 14, and the developing machine 20 are installed on the development segment 42.

The proxy server 22, the transfer server 24, and the access monitoring server 28 are installed on the DMZ segment 44.

The release terminal 18 is installed on a production access segment 48.

The release server 32 and the production machine 34 are installed on a production segment 51.

The developer of a business program codes the business program by using the developer terminal 12, and completes a unit test and a joint test on the developing machine 20. The developer stores an object file of the tested business program in the development-side area 38 of the network attached storage 26 by communication with the librarian system 100.

Then, the developer notifies, by communication with the librarian system 100, an approver as an immediate supervisor or the like that the developed business program is stored in the development-side area 38 of the network attached storage 26. The approver having received this notification accesses the network attached storage 26 from the approver terminal 14, and reads out the business program stored in the development-side area 38.

Subsequently, the approver checks the contents of this business program, and confirms that the program has a function matching the specification, has cleared all prescribed test items, and does not contain any unauthorized module. If the approver determines that there is no problem, the approver notifies the developer of approval by communication with the librarian system 100.

Whenever an event such as registration or approval of a business program occurs, the librarian system 100 obtains snapshot data such as the hash value, position, or path of the business program, and manages the obtained data by the blockchain.

The librarian system 100 periodically specifies a business program that is approved but is not moved, at a predetermined time interval, for example, once for every five minutes. After confirming that the current hash value of the specified business program matches the hash value of the business program held in the blockchain, the librarian system 100 issues a business program transfer request.

The librarian system 100 accesses the proxy server 22 and issues a transfer request command. This transfer request command contains the IP address of the librarian system 100, and the file name and storage location of the business program as a transfer target.

The proxy server 22 having received this transfer request command confirms that the IP address contained in the transfer request command matches the preset IP address of the librarian system 100, and transfers the transfer request command to the transfer server 24.

Only the librarian system 100 can perform authentication with respect to the proxy server 22. Even when the approver terminal 14 and the approver terminal 14 access, the proxy server 22 determines that authentication is impossible.

The transfer server 24 having received the transfer request command confirms that the IP address contained in the transfer request command matches the preset IP address of the proxy server 22, and issues a transfer request command to the network attached storage 26.

The controller 36 of the network attached storage 26 having received this transfer command confirms that the IP address contained in the transfer command matches the preset IP address of the transfer server 24, and transfers the corresponding business program from the development-side area 38 to the production-side area 40. After the transfer is complete, a transfer completion notification is transmitted in the order of the network attached storage 26 the transfer server 24 the proxy server 22 the librarian system 100.

With respect to the business program once transferred to the production-side area 40, no commands are accepted except a transfer command from the release server 32 as will be described later, and the controller 36 rejects all accesses from the developer terminal 12, the approver terminal 14, and the librarian system 100. Therefore, any malicious developer cannot install an unauthorized module in an unreleased business program held in the production-side area 40.

The procedure of business program release in the program management system 10 will be explained below.

The developer moves to the release terminal room 49, accesses the access monitoring server 28 from the release terminal 18 installed in the room, and issues a release request command. The access monitoring server 28 having received this release request command confirms that the IP address contained in the release request command matches the preset IP address of the release terminal 18, and transfers the release request command to the release server 32. The access monitoring server 28 records data exchange with the release terminal 18 in a log file.

The release server 32 having received the release request command from the access monitoring server 28 confirms that the IP address contained in the release request command matches the preset IP address of the access monitoring server 28, and transmits a transfer request for the corresponding business program to the network attached storage 26.

The controller 36 of the network attached storage 26 having received this program transfer request confirms that the IP address contained in the program transfer request matches the preset IP address of the release server 32, extracts the corresponding business program from the production-side area 40, and transfers the business program to the release server 32.

The release server 32 having received this business program transfers the business program to a predetermined directory of the production machine 34. Consequently, the release of the business program to the production machine 34 is complete. After that, the release server 32 transmits a release completion notification to the librarian system 100.

Due to a filtering function of the firewall 30, the release terminal 18 can transmit a release request command to the release server 32 via the access monitoring server 28, but cannot directly transmit the command. In addition, the access monitoring server 28 records access logs one after another. This makes it possible to prevent a malicious developer from releasing an unauthorized program to the production machine 34 via the release terminal 18.

The librarian system 100 is a system for managing the release of a developed business program to the production environment, and includes a plurality of (in the example shown in FIG. 1, five) servers in which the blockchain is installed. Each server can be a physical sever apparatus, and can also be a virtual server constructed on a physical server apparatus. Alternatively, at least one of the five servers can be a virtual server, and the rest can be physically independent servers.

Of the five servers, four servers (to be called internal servers 102 hereinafter) are managed by a subject that manages the program management system 10, and one server (to be called an auditing server 104 hereinafter) is managed by an auditing subject such as an auditing firm or an auditor. A firewall 106 is formed between the auditing server 106 and the four internal servers 102. Auditing to be performed by the auditing firm includes auditing of internal control. Since the auditing firm also participates in the blockchain as described above, the auditing firm shares the auditing record ledger and hence can check the log any time. This reduces the labor of auditing.

In the librarian system 100, the five servers participating in the blockchain can communicate with each other across a network such as the Internet or an intranet. Furthermore, the four internal servers 102 can communicate with the developer terminal 12 and the approver terminal 14 across the network.

The librarian system 100 is a scalable distributed peer-to-peer system capable of generating and holding a blockchain. Since the techniques for constructing and managing a blockchain are well known, they will not be described in detail in this specification (see, for example, PTL 2). In this embodiment, the security when librarians are automated is assured by improving data to be recorded in a block of the blockchain.

Figure 2:
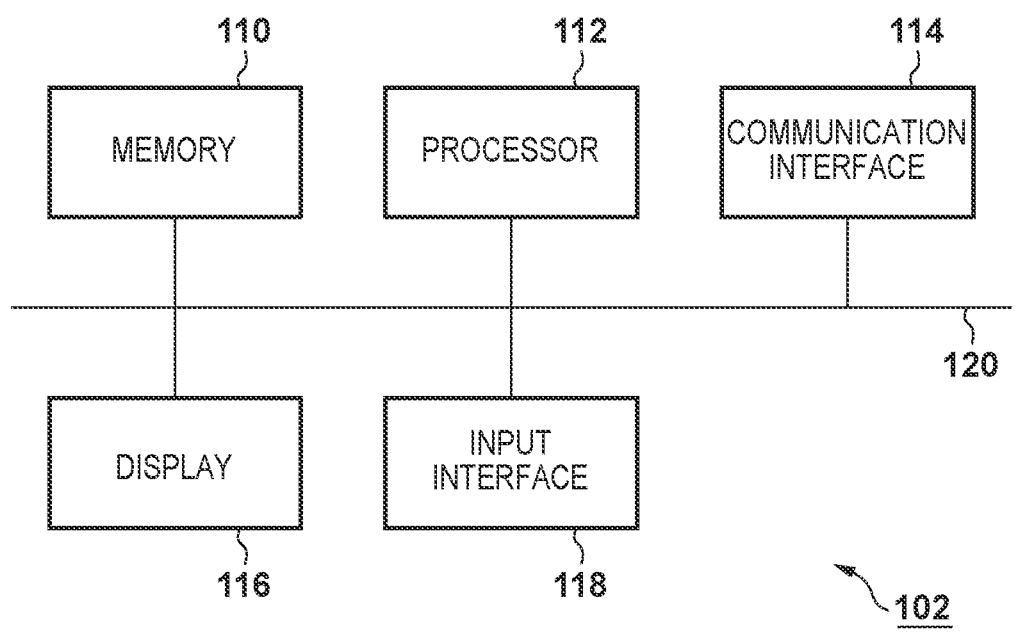
FIG. 2 is a view showing the hardware arrangement of an internal server shown in FIG. 1.

FIG. 2 is a view showing the hardware arrangement of the internal server 102 shown in FIG. 1. Each of the auditing server 104, the approver terminal 14, the developer terminal 12, the release terminal 18, the developing machine 20, the proxy server 22, the transfer server 24, the access monitoring server 28, the release server 32, and the production machine 34 can have the same hardware arrangement as that shown in FIG. 2. The internal server 102 includes a memory 110, a processor 112, a communication interface 114, a display 116, and an input interface 1118. These elements are connected to a bus 120 and communicate with each other via the bus 120.

The memory 110 is a storage area for storing data and programs. Data and programs can be stored in the memory 110 either permanently or temporarily.

The processor 112 implements various functions of the internal server 102 by executing the programs stored in the memory 110. The communication interface 114 is an interface for exchanging data between the internal server 102 and an external apparatus. The communication interface 114 is connected to the network and exchanges data with another internal server 102, the auditing server 104, the approver terminal 14, the developer terminal 12, and the proxy server 22 across the network. The display 116 is a device for displaying various kinds of information. The input interface 118 is a device for accepting inputs from the manager of this service.

Figure 3:
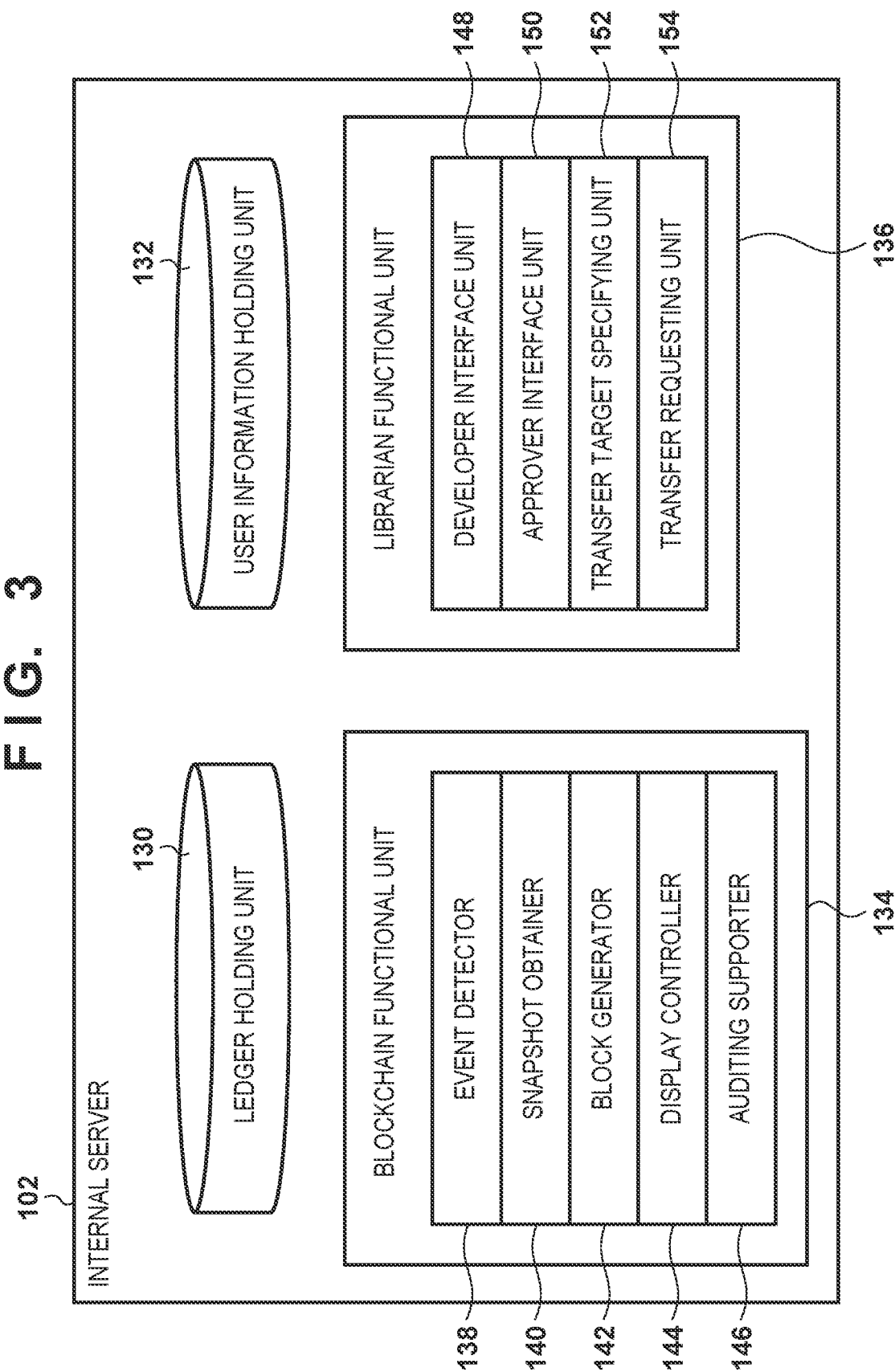
FIG. 3 is a block diagram showing the functions and arrangement of the internal server shown in FIG. 1.

FIG. 3 is a block diagram showing the functions and arrangement of the internal server 102 shown in FIG. 1. Each block shown in FIG. 3 can be implemented hardware-wise as an element or a mechanical device such as a CPU of a computer, and can also be implemented software-wise as a computer program or the like. FIG. 3 shows functional blocks implemented by cooperation of hardware and software. Accordingly, it is to be understood by those skilled in the art studying this specification that these functional blocks can be implemented in various forms by combining hardware and software.

The internal server 102 includes a ledger holding unit 130, a user information holding unit 132, a blockchain functional unit 134, and a librarian functional unit 136. The blockchain functional unit 134 implements blockchain-related functions. The blockchain functional unit 134 includes an event detector 138, a snapshot obtainer 140, a block generator 142, a display controller 144, and an auditing supporter 146. The librarian functional unit 136 implements functions for automating operations as a librarian. The librarian functional unit 136 includes a developer interface unit 148, an approver interface unit 150, a transfer target specifying unit 152, and a transfer requesting unit 154.

Each of the four internal servers 102 shown in FIG. 1 has the arrangement shown in FIG. 3. In another embodiment, only a specific (one or more) internal server 102 of the four internal servers 102 has the arrangement shown in FIG. 3, and other internal servers 102 have the ledger holding unit 130 and a blockchain managing function. In still another embodiment, the blockchain functional unit 134 and the librarian functional unit 136 of the arrangement shown in FIG. 3 are implemented by cooperation of the four internal servers 102. That is, in one example, one internal server 102 has the blockchain functional unit 134, and another internal server 102 has the librarian functional unit 136. The auditing server 104 basically has the ledger holding unit 130 and a blockchain managing function, and does not have the librarian functional unit 136. In another embodiment, the auditing server 104 can have the arrangement shown in FIG. 3. In any case, all the servers (the internal servers 102 and the auditing server 104) participating in the blockchain of the librarian system 100 have the same ledger holding unit 130.

Figure 4A:
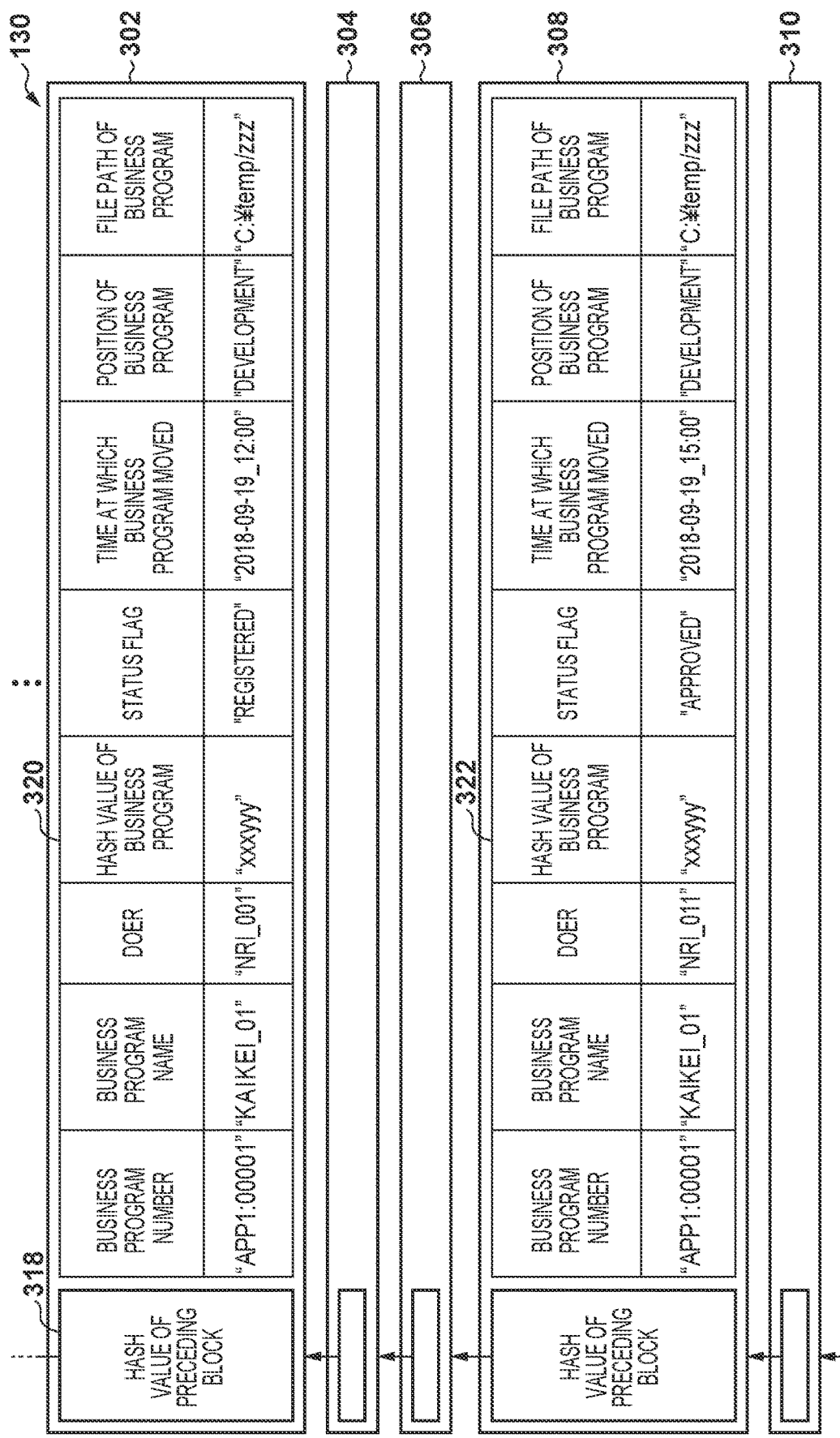
FIG. 4A is a data structure view showing an example of a ledger holding unit shown in FIG. 3.
Figure 4B:
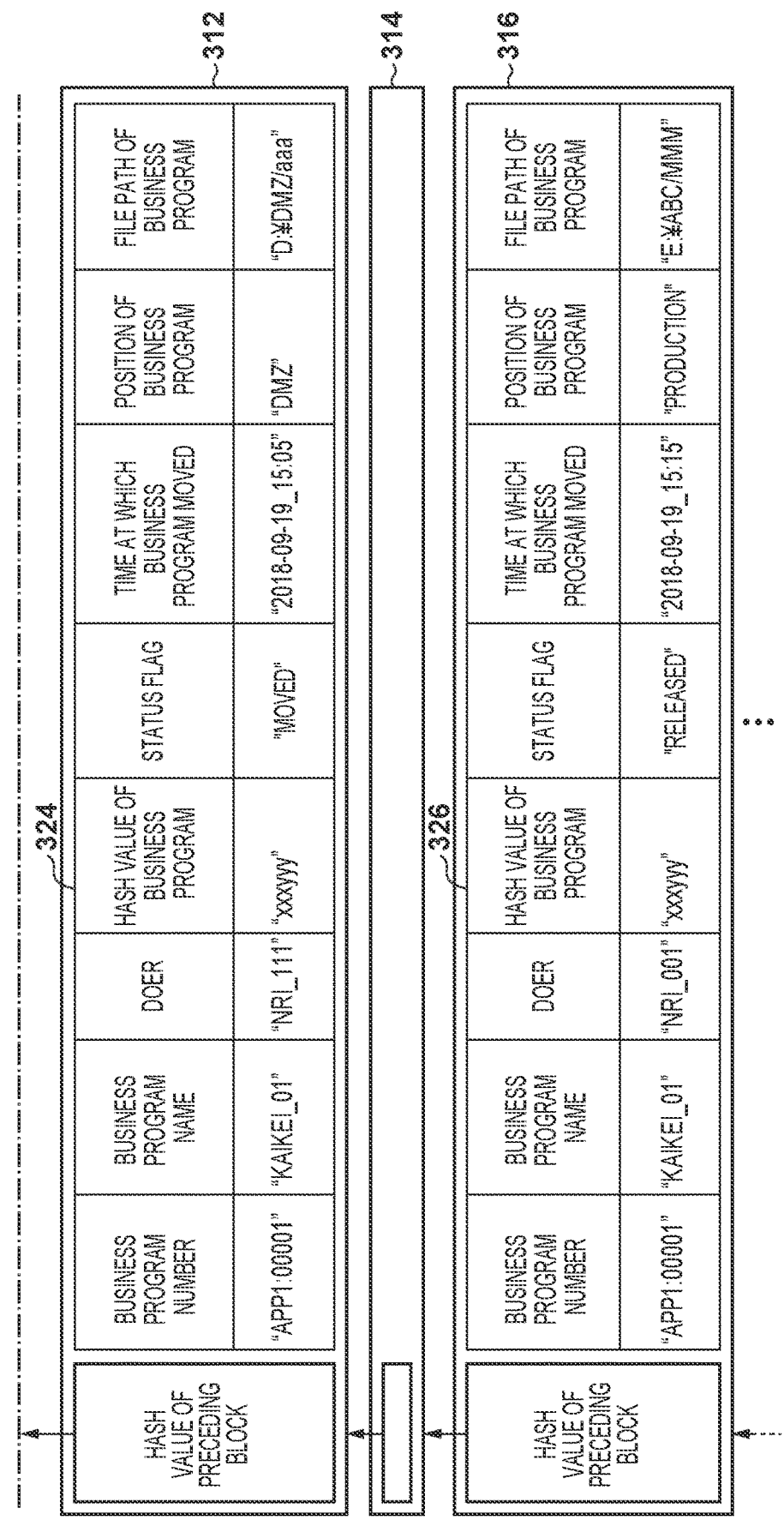
FIG. 4B is a data structure view showing the example of the ledger holding unit shown in FIG. 3.

FIGS. 4A and 4B are data structure views showing an example of the ledger holding unit 130 shown in FIG. 3. The ledger holding unit 130 holds blocks of the blockchain. A plurality of blocks 302, 304, 306, 308, 310, 312, 314, and 316 arranged in a time-series manner from a genesis block (not shown) are held in the ledger holding unit 130. The block 302 includes a hash value 318 of the preceding block and snapshot data 320 of a business program. Other blocks also have the same arrangement.

The snapshot data 320 of the business program holds, in association with each other, a number that specifies the business program, the name of the business program, the doer (subject) of a detected event, the hash value of the business program when the event was detected, a status flag that specifies the detected event, the time at which the business program moved or the event occurred, the position of the business program when the event was detected, and the file path of the business program when the event was detected.

The doer is recorded by the user ID of the doer. The position of the business program is set to one of "development" indicating the development-side area 38 of the network attached storage 26, "DMZ" indicating the production-side area 40 of the network attached storage 26, and "production" indicating the production machine 34. The hash value of the business program is unique information that assures the uniqueness of the business program when the event was detected. In another embodiment, it is also possible to use the size or the number of lines of the business program as the unique information, in addition to or in place of the hash value.

As described above in relation to FIG. 1, in the procedure from the development to the release of a business program in the program management system 10, the developed business program is moved from the development-side area 38 that can be accessed by the developer to the production-side area 40 that restricts or inhibits access from the developer, and is released by being further moved from the production-side area 40 to the production machine 34 in the production environment. "Event" is an event related to the release of a business program as described above, and the following four events are defined in this embodiment.

(1) Registration of a developed business program by the developer. The status flag is "registered". This event will be called a registration event hereinafter.
(2) Approval performed by an approver on a business program developed and held in the development-side area 38. The status flag is "approved". This event will be called an approval event hereinafter.
(3) The transfer of a business program from the development-side area 38 to the production-side area 40, which is automatically performed by the librarian functional unit 136. The status flag is "moved". This event will be called a transfer event hereinafter.
(4) The transfer of a business program from the production-side area 40 to the production machine 34 by the developer. The status flag is "released". This event will be called a release event hereinafter.

In relation to the registration event, the block 302 shown in FIG. 4A contains the snapshot data 320 obtained when a developer (NRI_001) registered a formed business program (KAIKEI_01) on a registration screen (to be described later).

In relation to the approval event, the block 308 shown in FIG. 4A contains snapshot data 322 obtained when an approver (NRI_011) having received a request from the developer approved the same business program (KAIKEI_01) on an approval screen (to be described later).

In relation to the transfer event, the block 312 shown in FIG. 4B contains snapshot data 324 obtained when the librarian functional unit 136 found the same business program (KAIKEI_01) having status flag="approved" and moved it to the production-side area 40 (DMZ).

In relation to the release event, the block 316 shown in FIG. 4B contains snapshot data 326 obtained when the developer (NRI_001) deployed (moved) the same business program (KAIKEI_01) to the production machine 34.

FIG. 5 is a data structure view showing an example of the user information holding unit 132 shown in FIG. 3. The user information holding unit 132 holds a user ID for specifying the user of the program management system 10, the name of the user, the e-mail address of the user, and the managerial position of the user in association with each other. In this embodiment, the managerial position is one of a developer, an approver, and a librarian (system).

In FIG. 5, each block contains one snapshot data. In another embodiment, however, one block may also contain a plurality of snapshot data. For example, when a plurality of business programs are transferred in business program transfer to be performed once for every five minutes, snapshot data of the plurality of business programs transferred as described above can collectively be stored in one block.

Referring to FIG. 3 again, the event detector 138 detects an event. The event detector 138 detects an event based on an event notification provided from the librarian functional unit 136 when the event occurred. The event detector 138 may also detect the occurrence of an event by monitoring the librarian functional unit 136.

When the event detector 138 detects an event, the snapshot obtainer 140 obtains snapshot data of a business program as a target of the event when the event was detected. For example, an event notification can be formed so as to contain all data items contained in the snapshot data. In this case, the snapshot obtainer 140 obtains snapshot data by referring to the event notification. Alternatively, the event notification need only contain at least the number of a business program as a target of the event and the type of the event. In this case, the snapshot obtainer 140 obtains other elements from the constituent elements of the program management system 10. For example, when the event notification does not contain the hash value of the business program, the snapshot obtainer 140 calculates the hash value of the business program. As another example, when the event notification contains the name of a doer, the snapshot obtainer 140 can also specify the user ID of the doer by referring to the user information holding unit 132.

The block generator 142 generates a blockchain block containing the snapshot data obtained by the snapshot obtainer 140. The block generator 142 adds this block containing the obtained snapshot data to the ledger holding unit 130 in accordance with a predetermined blockchain protocol, and requests other servers participating in the blockchain to add the same block. The generation or addition of a new block to the blockchain may also be implemented by using a well-known blockchain technique described in, for example, PTL 2.

The functions of the display controller 144 and the auditing supporter 146 will be described later by referring to typical screen views.

The developer interface unit 148 functions as an interface with the developer terminal 12. The developer interface unit 148 provides the developer terminal 12 with a registration screen (to be described later), and accepts registration of a business program from the developer through inputs on the screen. Upon accepting registration, the developer interface unit 148 generates an event notification indicating the occurrence of the registration event, and transmits the notification to the event detector 138. The developer interface unit 148 may also confirm that a person operating the developer terminal 12 is the developer by referring to the user information holding unit 132.

The approver interface unit 150 functions as an interface with the approver terminal 14. The approver interface unit 150 provides the approver terminal 14 with an approval screen (to be described later), and accepts approval of a business program from an approver through inputs on the screen. Upon accepting approval, the approver interface unit 150 generates an event notification indicating the occurrence of the approval event, and transmits the notification to the event detector 138. The approver interface unit 150 may also confirm that a person operating the approver terminal 14 is the approver by referring to the user information holding unit 132.

The transfer target specifying unit 152 periodically specifies a business program that is approved but is not moved, at a predetermined time interval, for example, once for every five minutes, by referring to the status flag contained in a block held in the ledger holding unit 130. The transfer target specifying unit 152 refers to the ledger holding unit 130 and specifies a business program for which the latest status flag is "approved". The transfer target specifying unit 152 accesses each specified business program by using the file path and calculates the hash value of the program. The transfer target specifying unit 152 compares the calculated hash value, that is, the current hash value of the specified business program with the latest hash value of the business program held in the ledger holding unit 130. If the two hash values match, the transfer target specifying unit 152 specifies the business program as a transfer target. If the two hash values do not match, the transfer target specifying unit 152 performs a predetermined warning process without specifying the business program.

The transfer requesting unit 154 automatically generates an instruction to transfer or move the business program specified as a transfer target by the transfer target specifying unit 152 from the development-side area 38 to the production-side area 40. The transfer requesting unit 154 requests business program transfer by transmitting the generated instruction to the proxy server 22.

The operation of the librarian system 100 having the above arrangement will be explained below.

Figure 6:
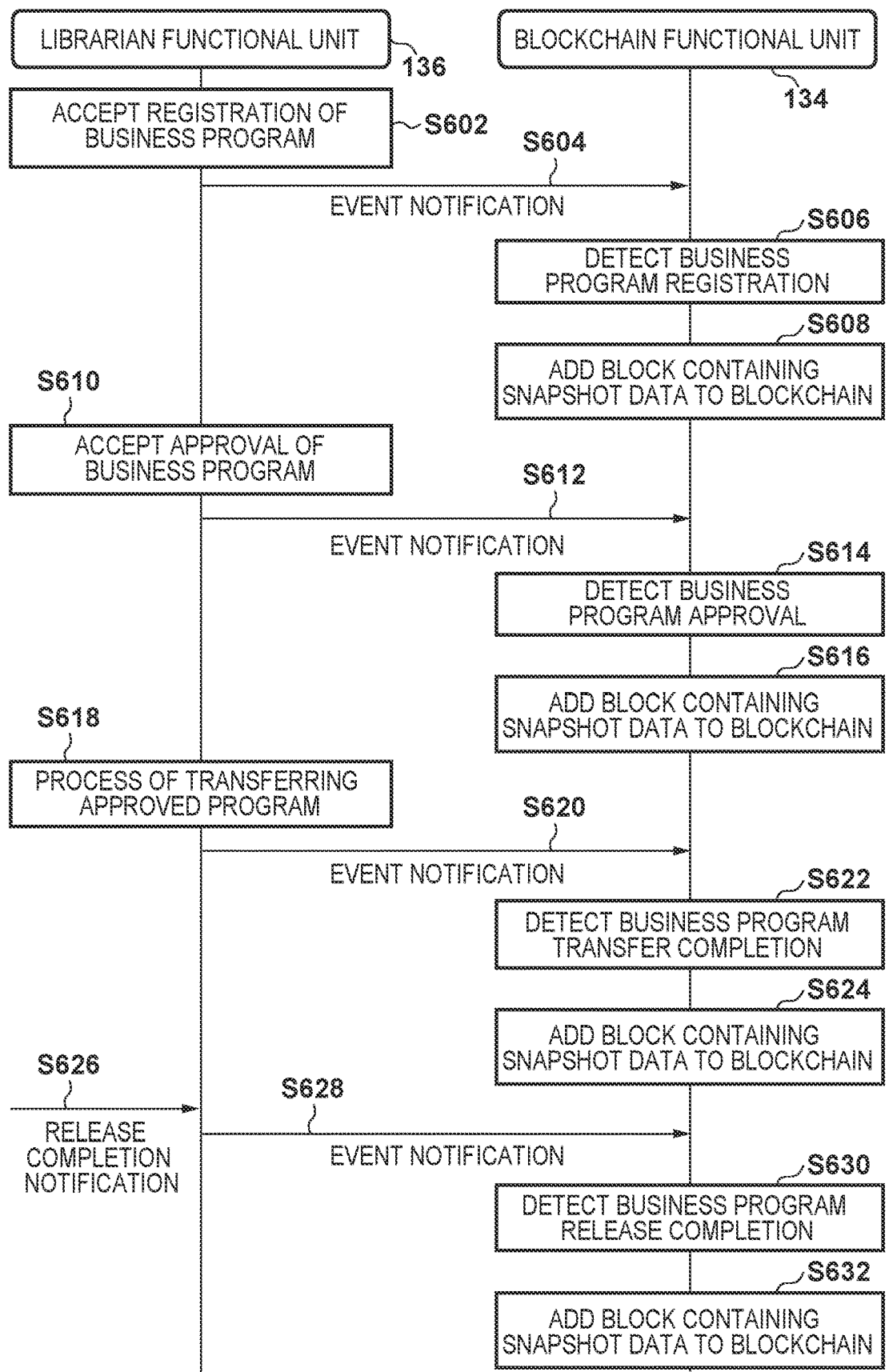
FIG. 6 is a flowchart showing the procedure of a series of processes in the librarian system shown in FIG. 1.

FIG. 6 is a flowchart showing the procedure of a series of processes in the librarian system 100 shown in FIG. 1. The librarian functional unit 136 accepts registration of a business program from the developer via the developer terminal 12 (step S602). The librarian functional unit 136 generates an event notification indicating the occurrence of the registration event, and transmits the notification to the blockchain functional unit 134 (step S604). The blockchain functional unit 134 receives the event notification in step S604 and detects the business program registration event (step S606).

The blockchain functional unit 134 adds a block containing snapshot data to the blockchain (step S608).

The librarian functional unit 136 accepts approval of the business program from the approver via the approver terminal 14 (step S610). The librarian functional unit 136 generates an event notification indicating the occurrence of the approval event, and transmits the notification to the blockchain functional unit 134 (step S612). The blockchain functional unit 134 receives the event notification in step S612 and detects the business program approval event (step S614). The blockchain functional unit 134 adds a block containing snapshot data to the blockchain (step S616).

The librarian functional unit 136 performs a process of transferring the approved business program from the development segment to the DMZ segment at a predetermined time interval (step S618). When this transfer process is complete, the librarian functional unit 136 generates an event notification indicating the occurrence of the transfer event, and transmits the notification to the blockchain functional unit 134 (step S620). The blockchain functional unit 134 receives the event notification in step S620 and detects the business program transfer event (step S622). The blockchain functional unit 134 adds a block containing snapshot data to the blockchain (step S624).

The librarian functional unit 136 receives a release completion notification indicating the completion of business program release from the release server 32 (step S626). The librarian functional unit 136 generates an event notification indicating the occurrence of the release event, and transmits the notification to the blockchain functional unit 134 (step S628). The blockchain functional unit 134 receives the event notification in step S628 and detects the business program release event (step S630). The blockchain functional unit 134 adds a block containing snapshot data to the blockchain (step S632).

Figure 7:
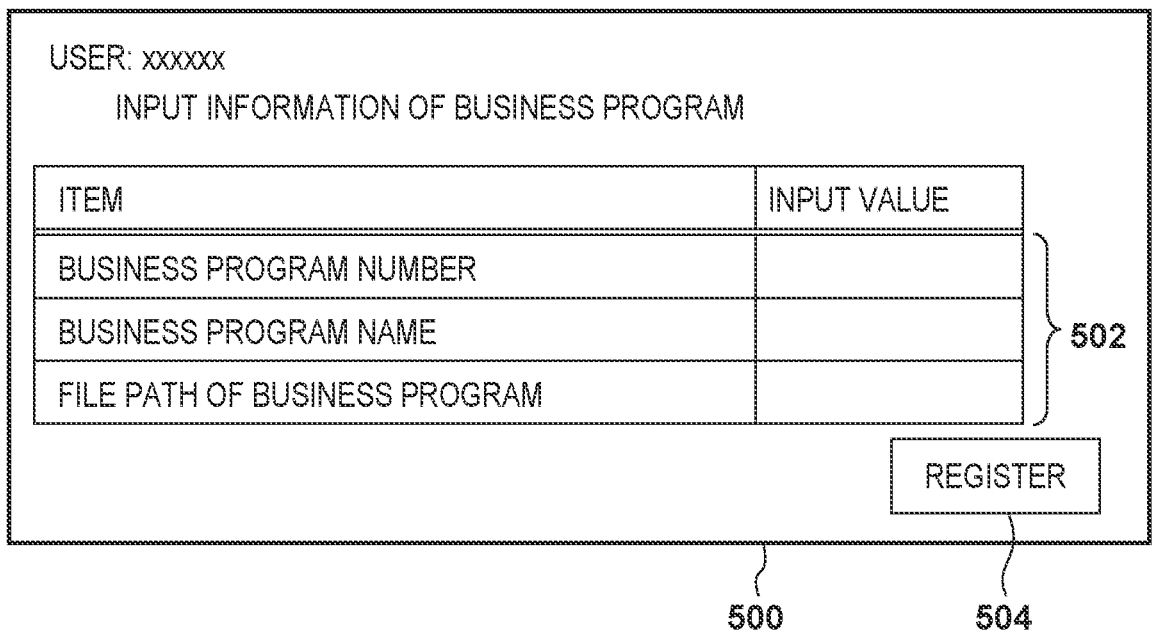
FIG. 7 is a view showing a typical screen of a registration screen displayed on the display of a developer terminal.

FIG. 7 is a view showing a typical screen of a registration screen 500 to be displayed on the display of the developer terminal 12. In step S602 of FIG. 6, the developer interface unit 148 of the librarian functional unit 136 transmits screen information of the registration screen 500 to the developer terminal 12. The developer terminal 12 causes the display to display the registration screen 500 based on the received screen information. The developer inputs the number, name, and file path of a business program in an input field 502 of the registration screen 500, and presses a registration button 504. The developer interface unit 148 receives the information input in the input field 502. The developer interface unit 148 specifies a login user of the developer terminal 12 when the registration screen 500 is displayed, as a doer. The developer interface unit 148 accesses the business program in accordance with the received business program file path, and calculates the hash value of the program. The developer interface unit 148 selects "registered" as the status flag. The developer interface unit 148 specifies the time at which the registration button 504 was pressed, as the time at which the registration event occurred. The developer interface unit 148 generates an event notification containing these pieces of information, and transmits the notification to the blockchain functional unit 134 as shown in step S604 of FIG. 6.

The approver interface unit 150 generates an approval screen 506 for requesting approval for the registered business program, and notifies the developer of the URL by e-mail. The developer requests the approver for approval based on the received URL. When the approver clicks the URL on the approver terminal 14, the display of the approver terminal 14 displays the approval screen 506.

Figure 8:
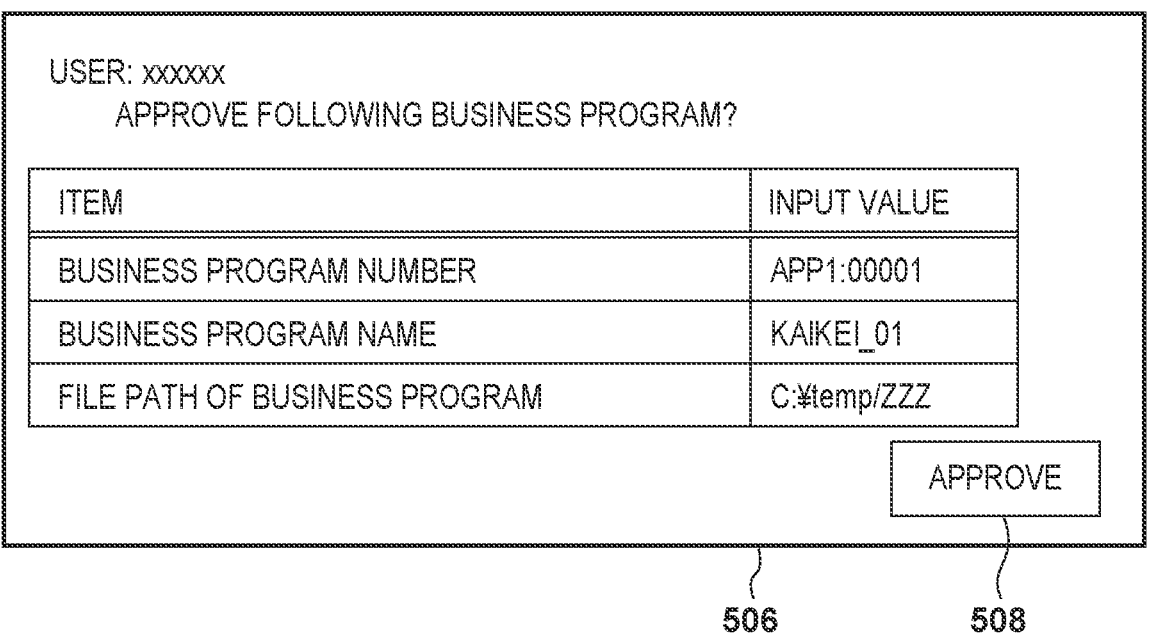
FIG. 8 is a view showing a typical screen of an approvable screen.

FIG. 8 is a view showing a typical screen of the approval screen 506. Based on the information displayed on the approval screen 506, the approver confirms the validity of the business program by asking the developer to present the source code and specification of the business program. When the confirmation is complete, the approver presses an approval button 508 on the approval screen 506. Upon detecting the pressing of the approval button 508, the approver interface unit 150 specifies a login user of the approver terminal 14 when the approval screen 506 is displayed, as a doer. The approver interface unit 150 accesses the business program in accordance with the file path of the business program displayed on the approval screen 506, and calculates the hash value of the program. The approver interface unit 150 selects "approved" as the status flag. The approver interface unit 150 specifies the time at which the approval button 508 was pressed, as the time at which the approval event occurred. The approver interface unit 150 generates an event notification containing these pieces of information, and transmits the notification to the blockchain functional unit 134 as shown in step S612 of FIG. 6.

The display controller 144 of the blockchain functional unit 134 receives a request for displaying a management screen 510 from one of the developer terminal 12, the approver terminal 14, and the librarian system 100 as servers. Upon receiving this request, the display controller 144 generates the management screen 510 for displaying an event having occurred for a predetermined business program and a hash value obtained when the event was detected in association with each other, by referring to the block held in the ledger holding unit 130, and causes the display to display the generated management screen 510.

Figure 9:
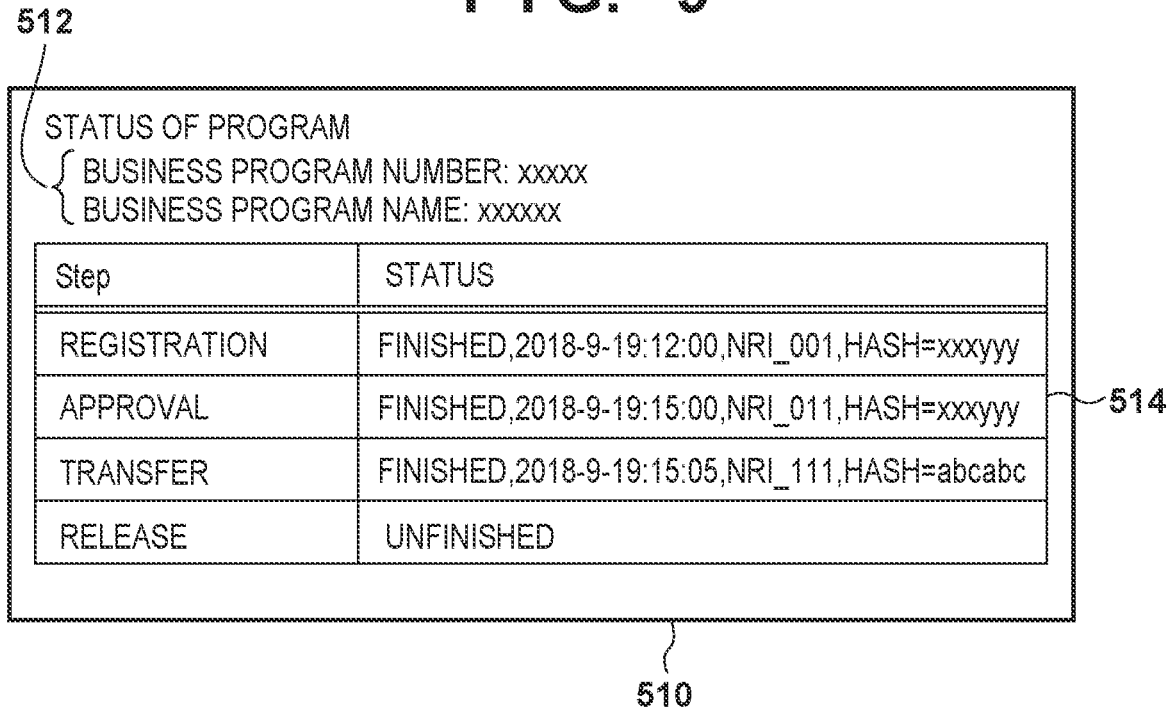
FIG. 9 is a view showing a typical screen of a management screen.

FIG. 9 is a view showing a typical screen of the management screen 510. The management screen 510 has a program specification information display region 512 for displaying the number and name of a business program, and a status display region 514 for displaying the status of the business program. The status display region 514 displays, for each event, whether the event is detected, the detection time of the event, the doer, and the hash value of the business program obtained when the event was detected. In this example shown in FIG. 9, a hash value obtained when an approval event was detected and a hash value obtained when a transfer event was detected are different. This makes it possible to detect that the business program was rewritten during a period from the completion of approval to the occurrence of transfer.

In auditing, an important auditing index is that there is no omission in the procedure of registration, approval, transfer, and release of a given business program. Snice the librarian system 100 can provide a screen having a high perspicuity as shown in FIG. 9 by using the traceability of a blockchain, the efficiency of auditing can be increased. In addition, when the librarian system 100 includes the auditing server 104, an auditor can display the management screen 510 as shown in FIG. 9 on the display of his or her terminal without visiting an enterprise (a subject that manages the program management system 10), and this can further increase the auditing efficiency.

As described above, the librarian system 100 including the auditing server 104 can reduce the load of auditing because an auditor need not visit an enterprise as an auditing target. In addition, the auditing supporter 146 generates various screens for displaying statistical information on the release of a business program by referring to blocks held in the ledger holding unit 130, and displays the screens on the display of the auditing server 104. This can implement more efficient and effective auditing.

Conventional auditing is often performed by confirming whether internal control is secured by auditing tens of thousands of auditing target programs at random. However, this makes it difficult to hold the reliability of confirmation on whether control is assured at a predetermined level. In the case of internal control, business programs (or modules) like the following are concerns for the control.

The number of times of applications from the same developer is very large within a predetermined period.

A production application is often delayed (for example, a business program does not operate even after the elapse of a week or more, or a release application is issued again before a production operation).

Developers are often changed within a predetermined period for the same business program.

The librarian system 100 can record the characteristics as described above as statistical numbers by using the traceability of a blockchain. More specifically, the auditing supporter 146 integrates the abovementioned statistical numbers every other day for each business program. This integration is performed throughout the year because auditing is performed every year. At the time of auditing, the auditing supporter 146 displays a support screen containing the information on a PC of an auditor. Accordingly, the reliability of confirmation on whether control is assured can be held at a predetermined level.

Figure 10:
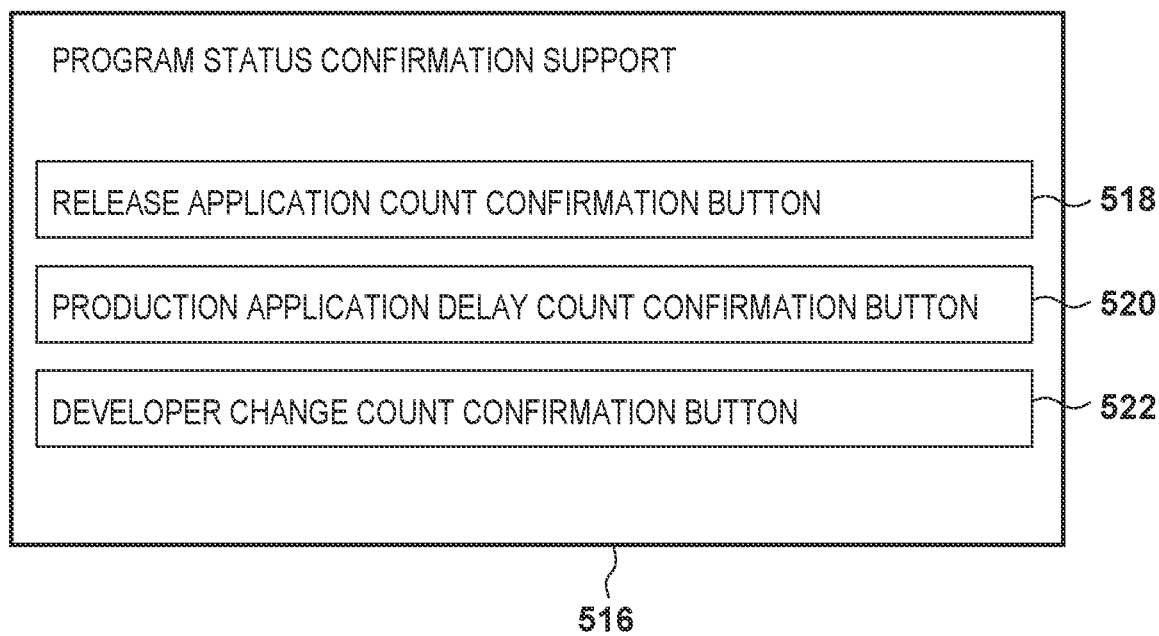
FIG. 10 is a typical screen of a selection screen provided by an auditing supporter.

FIG. 10 is a view showing a typical screen of a selection screen 516 to be provided by the auditing supporter 146. The selection screen 516 is a screen for allowing an auditor to select a support screen to be displayed, and has a release application count confirmation button 518, a production application delay count confirmation button 520, and a developer change count confirmation button 522.

When the release application count confirmation button 518 is pressed on the selection screen 516, the auditing supporter 146 displays a release application account confirmation screen 524 on the display of a PC of the auditor. FIG. 11 is a view showing a typical screen of the release application amount confirmation screen 524.

When the production application delay count confirmation button 520 is pressed on the selection screen 516, the auditing supporter 146 displays a production application delay count confirmation screen 526 on the display of the PC of the auditor. FIG. 12 is a view showing a typical screen of the production application delay count confirmation screen 526.

When the developer change count confirmation button 522 is pressed on the selection screen 516, the auditing supporter 146 displays a developer change count confirmation screen 528 on the display of the PC of the auditor. FIG. 13 is a view showing a typical screen of the developer change count confirmation screen 528.

In the above-described embodiment, examples of the holding unit are a hard disk and a semiconductor memory. Also, it is to be understood by those skilled in the art studying this specification that each unit can be implemented by, for example, a CPU, an installed application program module or system program module, or a semiconductor memory for temporarily storing the contents of data read out from a hard disk (none of them is shown).

The librarian system 100 according to this embodiment can save manpower because the librarian functional unit 136 automatically performs works conventionally manually performed by librarians. For assurance of the security, trails having both unalterability and traceability can be provided by managing snapshot data generated for each event by a blockchain. In addition, the efficiency of auditing can be increased because the auditor also participates in the blockchain.

Figure 14:
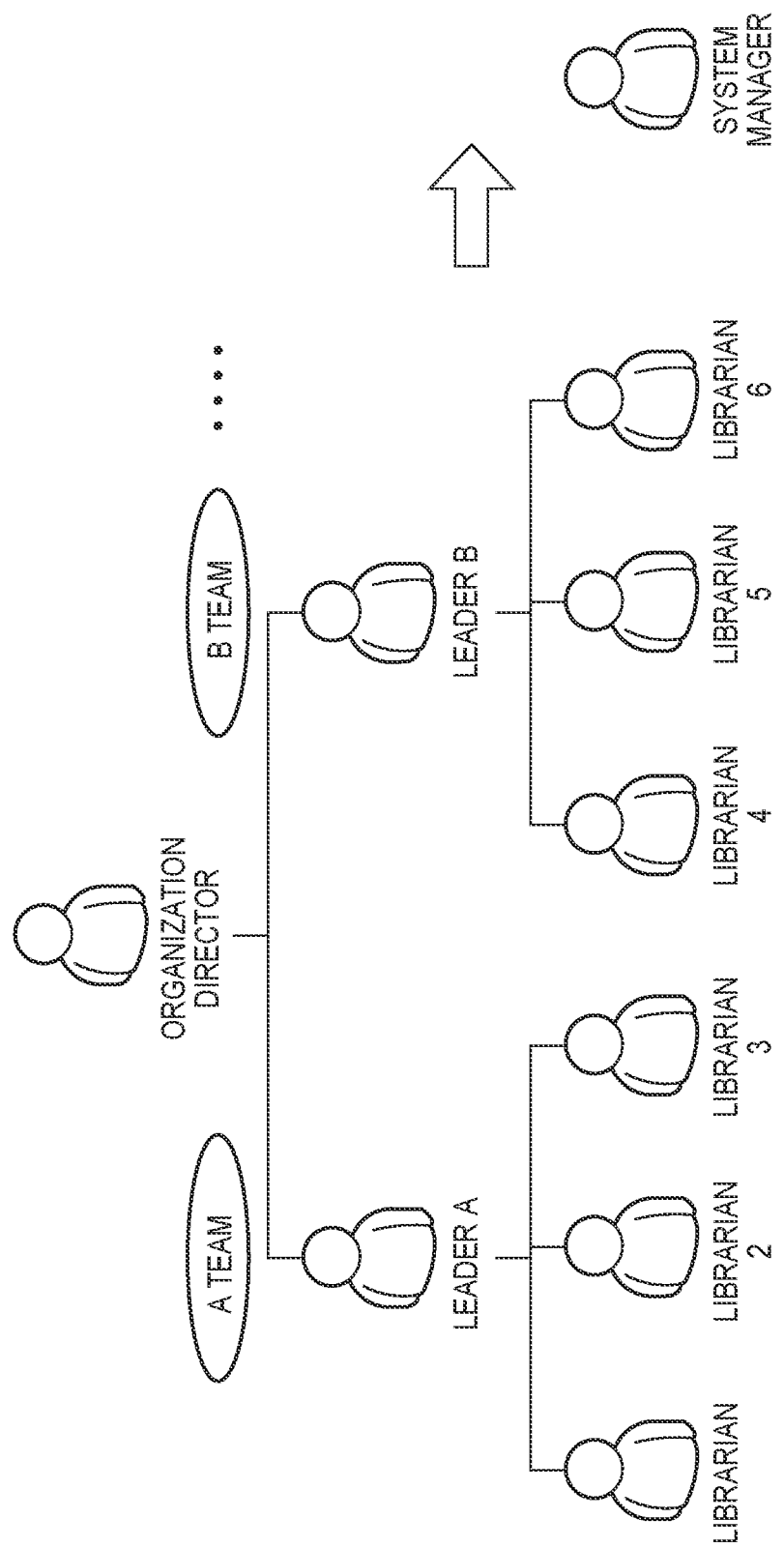
FIG. 14 is a view showing an image representing a manpower saving effect.

FIG. 14 is a view showing an image representing the manpower saving effect. When using the system described in PTL 1, a relatively large librarian organization is necessary as shown on the left side of FIG. 14. By contrast, when adopting the librarian system 100 according to this embodiment, only one manager (on the right side of FIG. 14) of the librarian system 100 is necessary, and the librarian system 100 automatically performs all the rest, for example, works as a librarian, assurance of the security, and reception to an auditor.

In the first embodiment, the case in which the librarian system 100 obtains snapshot data of a business program for each event and forms a blockchain of the procedure of the snapshot data has been explained. This technical concept is applicable to a program release management system complying with J-SOX, and is also applicable to general paperwork in a business workflow-based job.

Second Embodiment

In the first embodiment, increasing the efficiency of an auditing work by using the traceability of a blockchain has been explained. In the second embodiment, implementation of a function of assuring the perfectness as an auditing system will be explained.

The librarian system 100 of the first embodiment can also be regarded as an auditing system. The following two points are important requirements when systematizing auditing.
Requirement 1. Certify that no unauthorized work has been done when a server is down When a server stops due to a failure or the like, it is necessary to certify that no unauthorized operation is performed during a restoration work. Conventionally, this is assured by organization control, for example, by replacing a worker with a third-party organization having no interest.
Requirement 2. Certify that an auditing-related program is not unauthorizedly altered during operation.

It is necessary to certify that an auditing-related program is not unauthorizedly altered during operation. Conventionally, this certification is performed at the time of auditing by periodically printing out a program code.

Conventionally, the certification that the above two requirements are satisfied is basically performed by submitting documents, and this takes much labor. In this embodiment, therefore, an auditing system adopting a blockchain certifies these requirements by recording its normal operation record on the ledger of its blockchain. That is, the system certifies its normal operation record by an unalterable blockchain.

FIG. 15 is a schematic view showing an auditing system 800 according to the second embodiment. The auditing system 800 is a system that performs auditing such as auditing of the business program release work explained in the first embodiment, and manages the record of the auditing. The auditing system 800 includes a plurality of (in this example shown in FIG. 15, five) servers 802, 804, 806, 808, and 810 in which a blockchain is installed.

The second embodiment uses the feature that a plurality of ledgers can be managed in a blockchain. The auditing system 800 includes three ledgers each of which is managed in accordance with a blockchain protocol. The three ledgers are (1) an auditing record ledger (called an auditing ledger 812) as a main ledger, (2) a server operation certification record ledger (called an operation certification ledger 814), and (3) an auditing-related program validity certification record ledger (called a validity certification ledger 816). The auditing ledger 812 is a ledger that holds information for complying with, for example, J-SOX, and can correspond to the ledger holding unit 130 of the first embodiment. The operation certification ledger 814 holds normality certification information of the operation of the auditing system 800. The validity certification ledger 816 holds non-alteration certification information of main functions.

The auditing system 800 is configured by a plurality of virtual servers constructed on one server apparatus. That is, each of the plurality of servers 802, 804, 806, 808, and 810 is a virtual server. Since the auditing system 800 uses majority decision between the servers as will be described later, the number of virtual servers participating in the blockchain of the auditing system 800 is an odd number, and the minimum number is 3. The number of virtual servers is 5 in the example of FIG. 15. Server virtualization is a well-known technique that abstracts and pools computer resources (for example, a CPU, a memory, a network interface, and a recording device), thereby making a plurality of virtual servers operable on one physical server. The virtual servers of the auditing system 800 are implemented by using this well-known server virtualization technique.

In the server virtualization, physical resources are managed and abstracted by a hypervisor. A virtual resource is allocated to the OS of each virtual server. Accordingly, the virtual servers can be deleted or duplicated by a relatively simple work executed by software.

Figure 16A:
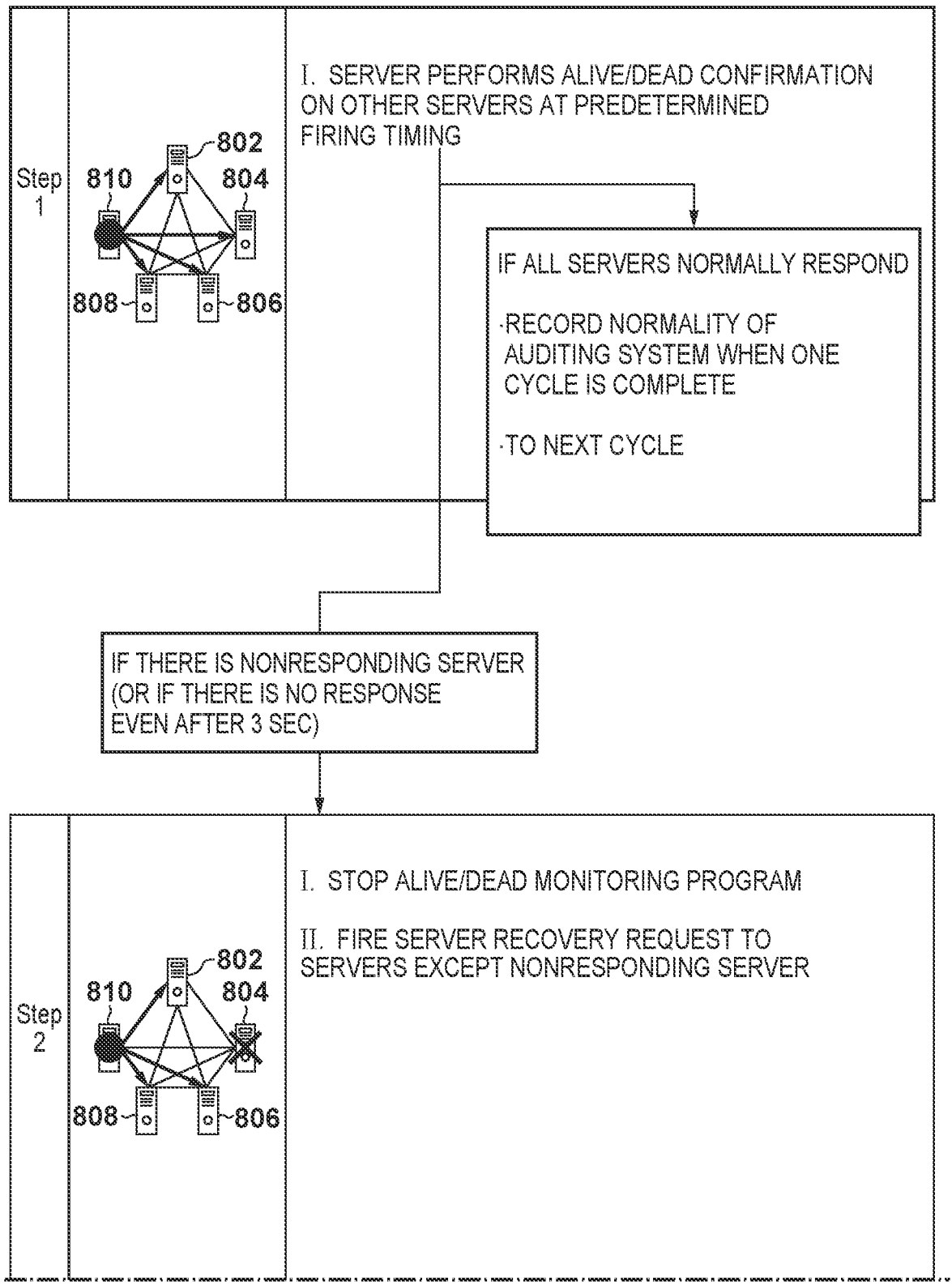
FIG. 16A is a flowchart showing the procedure of processing of certification (requirement 1) indicating that no unauthorized work is performed at the time of server down.

FIGS. 16A and 16B are flowcharts showing the procedure of processing of certification (requirement 1) indicating that no unauthorized work has been done at the time of server down. At a predetermined firing timing, the server 810 of the auditing system 800 performs alive/dead confirmation for the servers 802, 804, 806, and 808 (step 1). A practical example of the firing timing will be described later. "Firing" is to transmit information to a plurality of servers practically at the same time or in order.

If all the servers 802, 804, 806, and 808 normally respond, the server 810 as the confirmation source transfers the process to the next server 802. The server 802 performs the alive/dead confirmation of step 1. If the alive/dead confirmation thus performed in order returns to the first server with all the servers being normal, the auditing system 800 records the normality of the auditing system 800 in the operation certification ledger 814 at the end timing of this cycle, and proceeds to the next cycle.

If the server 804 does not respond to the alive/dead confirmation in step 1 or there is no response even after a predetermined time (for example, 3 sec), the server 810 as the confirmation source stops an alive/dead monitoring program, and fires a server recovery request to the servers 802, 806, and 808 except the nonresponding server 804 (step 2).

The server 802 having received the server recovery request transmitted in step 2 performs alive/dead confirmation for the servers 804, 806, 808, and 810 except the server 802 (step 3). If all the servers 804, 806, 808, and 810 respond to this confirmation (if there is no nonresponding server), the server 802 returns or transmits rejection of the recovery work to the server 810 as the request source. If the server 804 that does not respond to this confirmation is found, the server 802 returns a recovery work approval and the server name of the nonresponding server 804 to the server 810 as the request source. "Return" can also be said to be "send back" or "transmit".

The server 810 as the request source adds up the responses from the servers 802, 806, and 808 as the request destinations (step 4). An addition target of this addition is only the server 804 found by the server 810 as the request source and suspected of being failed (not responding). If the result of the addition is rejection by majority decision, the server 810 as the request source cancels the recovery work, handles this event as a detection error, and resumes the alive/dead monitoring program. If the addition result is adoption by majority decision, the server 810 as the request source starts the recovery work.

The recovery work in step 5 is performed by the following procedure.
(1) The server 810 as the request source disconnects the specified server 804 suspected of being failed from the blockchain, and deletes the server 804. The server 810 as the request source adds, to the operation certification ledger 814, a block containing the disconnection time, the number of constituent servers, the name of the disconnected server, the reason (=failure disconnection), and the state (=abnormal).
(2) The server 810 as the request source generates a duplicate of a virtual machine of its own (the server 810), and sets the server name of the deleted server 804 as the server name of a generated server 818.
(3) When the duplication of the server is complete, the server 810 as the request source causes the generated server 818 to take part in the blockchain network. The server 810 as the request source adds, to the operation certification ledger 814, a block containing the recovery time, the number of constituent servers, the generated server name (=disconnected server name), the reason (=recovery completion), and the state (=abnormal).
(4) The server 810 as the request source resumes the alive/dead monitoring program from a time closest to the current time.

FIG. 17 is a view showing an example of the firing timing. The number of cycles to be repeated per minute changes in accordance with the number of constituent servers. For example, three cycles are repeated per minute when the number of constituent servers is 3, and one cycle is performed per minute when the number of constituent servers is 7.

Figure 18A:
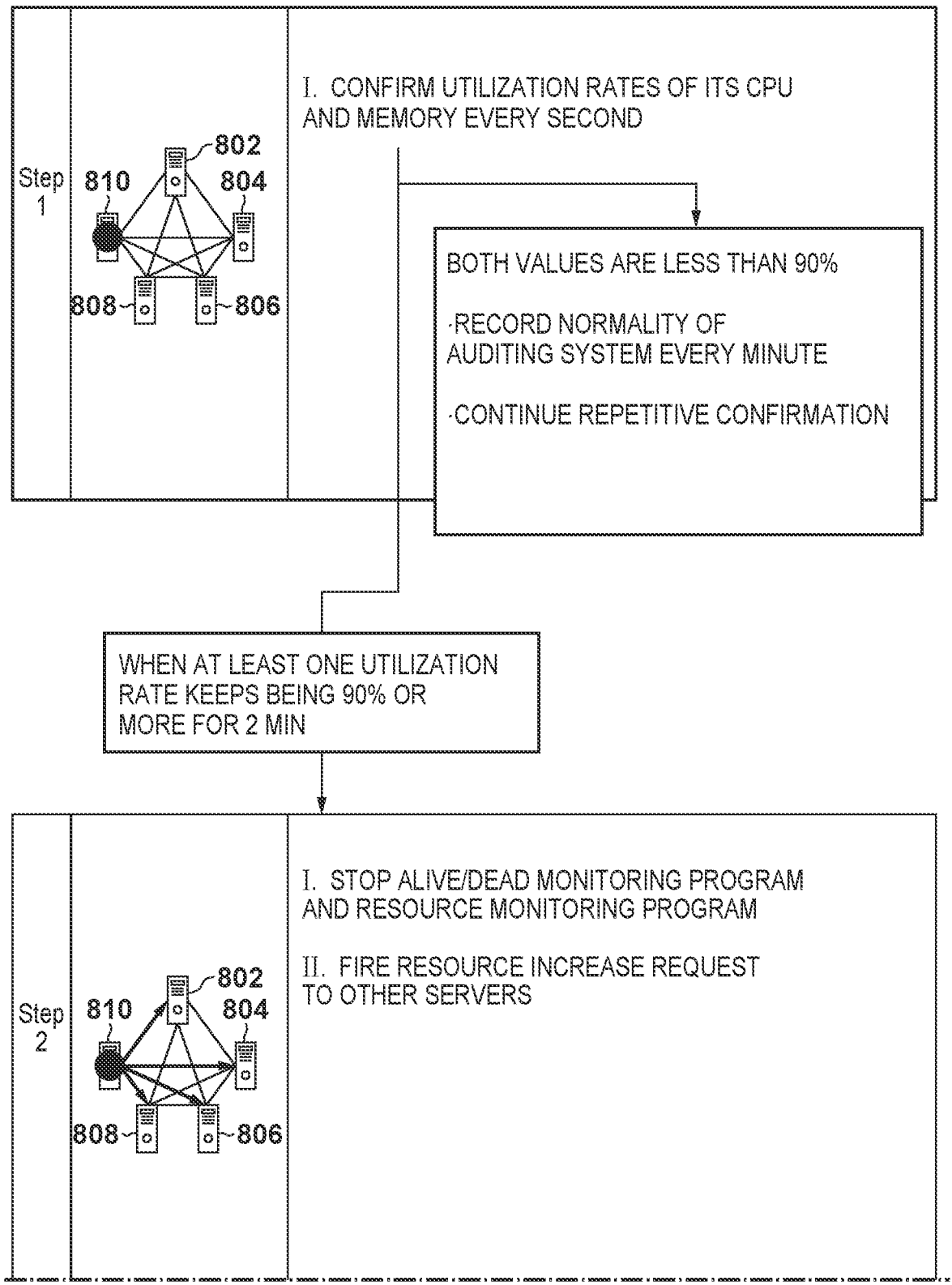
FIG. 18A is a flowchart showing the procedure of processing of validity assurance (requirement 1) for cancellation of resource deficiency caused by CPU rise.

FIGS. 18A and 18B are flowcharts showing the procedure of processing of validity assurance (requirement 1) for cancellation of resource deficiency caused by CPU rise. The server 810 of the auditing system 800 confirms the utilization rates of its CPU and memory every second (step 1). The servers 802, 804, 806, and 808 also perform the same confirmation. If a state in which the utilization rate of the CPU is a threshold, that is, less than 90% and that of the memory is less than 90% in all the servers 802, 804, 806, 808, and 810 continues 1 min, the auditing system 800 records the normality of the auditing system 800 in the operation certification ledge 814 when this 1-min cycle is complete, and proceeds to the next cycle, thereby continuing repetitive confirmation.

If a state in which the utilization rate of at least one of the CPU and the memory of the server 810 is 90% or more continues 2 min, the server 810 stops the alive/dead monitoring program and the resource monitoring program. The server 810 fires a resource increase request to the servers 802, 804, 806, and 808 (step 2).

The servers 802, 804, 806, and 808 having received the resource increase request in step 2 confirm the CPU utilization rate and the memory utilization rate of the server 810 as the request source (step 3). If the confirmation result shows that both the CPU utilization rate and the memory utilization rate are less than 90%, the servers 802, 804, 806, and 808 as the request destinations return rejection of the resource increasing work to the server 810. If the confirmation result shows that the utilization rate of at least one of the CPU and the memory is 90% or more, the servers 802, 804, 806, and 808 as the request destinations return a resource increase approval to the server 810 as the request source.

The server 810 as the request source adds up the responses from the servers 802, 806, and 808 as the request destinations (step 4). If the addition result is rejection by majority decision, the server 810 as the request source cancels the release increasing work, handles this event as a detection error, and resumes the alive/dead monitoring program and the resource monitoring program. If the addition result is adoption by majority decision, the server 810 as the request source starts the resource increasing work.

The resource increasing work in step 5 is performed by the following procedure.
(1) The request-source server 810 obtains the number of current constituent servers from the operation certification ledger 814. If the number of constituent servers does not reach 11 as a maximum number, the request-source server 810 determines to increase two servers at once. Note that 11 as the maximum number may also be changed in accordance with, for example, the performance of a physical server apparatus and the expectation of increase.
(2) The request-source server 810 generates two virtual servers 820 and 822 by duplicating itself. Consecutive numbers are set as the names of these servers. Since the auditing system 800 adopts the majority decision system, an odd number of servers are maintained as a total in order to hold majority decision.
(3) When the server duplication is complete, the request-source server 810 causes the two generated servers 820 and 822 to take part in the blockchain network. The request-source server 810 adds, to the operation certification ledger 814, a block containing the increase time, the number of constituent servers after the increase, the server names, the reason (=node addition), and the state (=abnormal).
(4) The request-source server 810 resumes the alive/dead monitoring program and the resource monitoring program from a time closest to the current time.

Figure 19A:
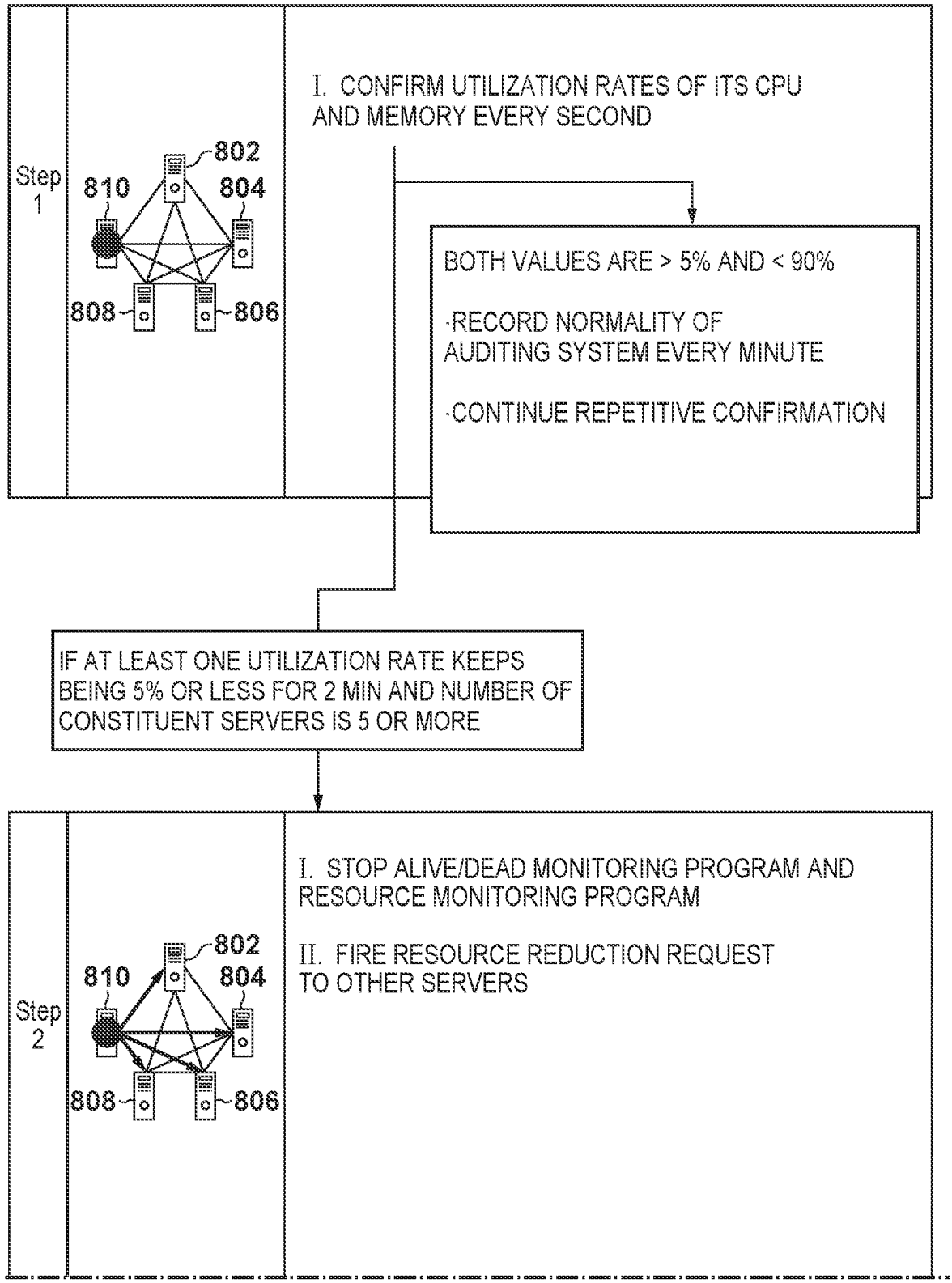
FIG. 19A is a flowchart showing the procedure of processing of validity assurance (requirement 1) for reduction after cancellation of resource deficiency caused by CPU rise.

FIGS. 19A and 19B are flowcharts showing the procedure of processing of validity assurance (requirement 1) for reduction after cancellation of resource deficiency caused by CPU rise. The server 810 of the auditing system 800 confirms the utilization rates of its CPU and memory every second (step 1). The servers 802, 804, 806, and 808 also perform the same confirmation. If a state in which both the CPU utilization rate and the memory utilization ratio are more than 5% and less than 90% continues 1 min in all the servers 802, 804, 806, 808, and 810, the auditing system 800 records the normality of the auditing system 800 in the operation certification ledger 814 when this 1-min cycle is complete, and proceeds to the next cycle, thereby continuing repetitive confirmation.

If a state in which at least one of the CPU utilization rate and the memory utilization rate of the server 810 is 5% or less continues 2 min and the number of constituent servers is 5 or more, the server 810 stops the alive/dead monitoring program and the resource monitoring program. The server 810 fires a resource reduction request to the servers 802, 804, 806, and 808 (step 2).

The servers 802, 804, 806, and 808 having received the resource reduction request in step 2 confirm the CPU utilization rate and the memory utilization rate of the request-source server 810 (step 3). If the confirmation result shows that both the CPU utilization rate and the memory utilization rate are more than 5% and less than 90%, the request-destination servers 802, 804, 806, and 808 return rejection of the resource reducing work to the request-source server 810. If the confirmation result shows that at least one of the CPU utilization rate and the memory utilization rate is 5% or less, the request-destination servers 802, 804, 806, and 808 return a resource reduction approval to the request-source server 810.

The request-source server 810 adds up the responses from the request-destination servers 802, 806, and 808 (step 4). If the addition result is rejection by majority decision, the request-source server 810 cancels the release reducing work, handles this event as a detection error, and resumes the alive/dead monitoring program and the resource monitoring program. If the addition result is adoption by majority decision, the request-source server 810 starts the resource reducing work.

The resource reducing work in step 5 is performed by the following procedure.

(1) The request-source server 810 obtains the number of current constituent servers from the operation certification ledger 814. If the number of constituent servers does not reach 3 as a minimum number, the request-source server 810 determines to delete two servers at once.

(2) The request-source server 810 specifies two servers having the largest and second largest numbers as server names as deletion targets, and deletes the specified servers 804 and 806. Since the auditing system 800 adopts the majority decision system, an odd number of servers are maintained as a total in order to hold majority decision.

(3) When the sever deletion is complete, the request-source server 810 adds, to the operation certification ledger 814, the deletion time, the number of constituent servers after the deletion, the deleted server names, the reason (=node deletion), and the state (=abnormal).

(4) The request-source server 810 resumes the alive/dead monitoring program and the resource monitoring program from a time closest to the current time.

Figure 20B:
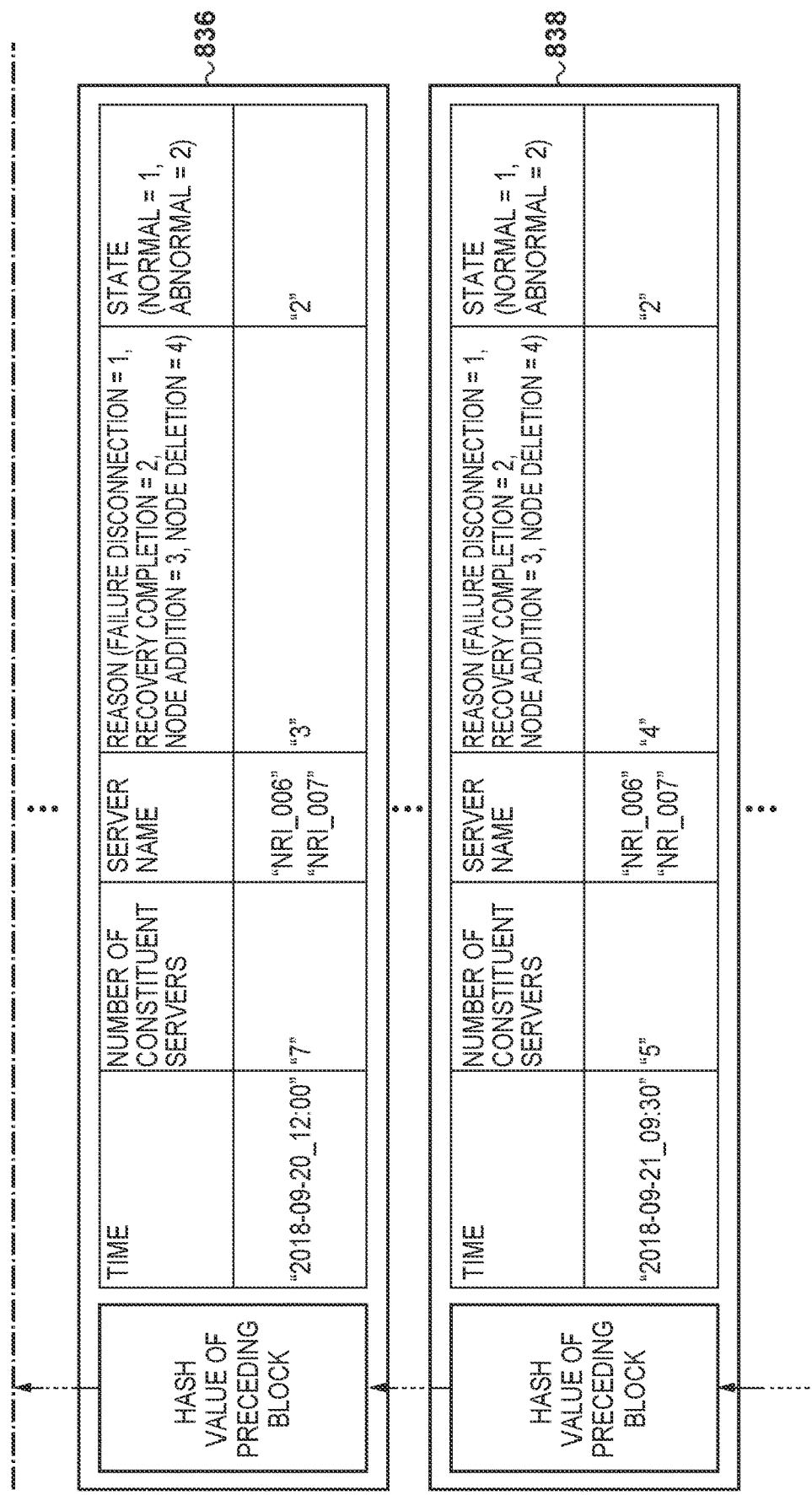
FIG. 20B is a data structure view showing the example of the operation certification ledger shown in FIG. 15.

FIGS. 20A and 20B are data structure views showing an example of the operation certification ledger 814 shown in FIG. 15. The operation certification ledger 814 holds blocks of the blockchain. A plurality of blocks 830, 832, 834, 836, and 838 arranged in a time-series manner from a genesis block (not shown) are held in the operation certification ledger 814. The block 830 contains a hash value 840 of the preceding block and operation data 842 indicating the operation status of the auditing system 800. Other blocks have the same arrangement.

Figure 21A:
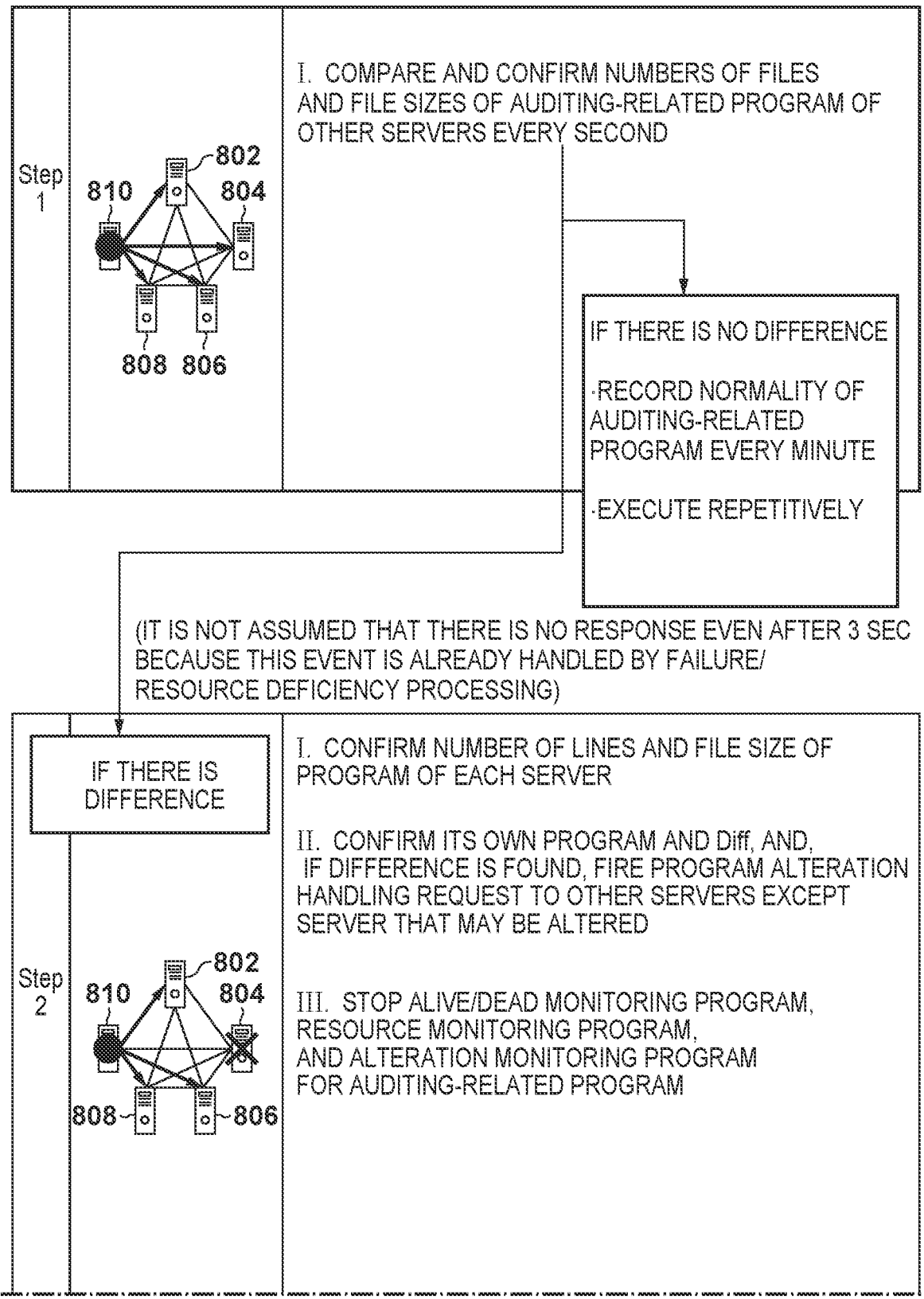
FIG. 21A is a flowchart showing the procedure of processing of certification (requirement 2) indicating that an auditing-related program is not unauthorizedly altered during operation.

FIGS. 21A and 21B are flowcharts showing the procedure of processing of certification (requirement 2) indicating that an auditing-related program is not unauthorizedly altered during operation. The server 810 of the auditing system 800 requests comparative confirmation of the number of lines and the file size (the number of bytes) of the auditing-related program for the servers 802, 804, 806, and 808 every second (step 1). Note that it is also possible to use one of the number of lines and the file size, or use the hash value of the auditing-related program in place of or in addition to the number of lines or the file size. If a state in which the numbers of lines and the file sizes of the auditing-related program have no differences continues 1 min, the auditing system 800 records the normality of the auditing-related program in the validity certification ledger 816 at the timing at which the 1-min cycle is complete, and proceeds to the next cycle, thereby continuing repetitive confirmation.

If there is a difference (it is not assumed that there is no response because this event is already handled in the above-described failure/resource excess-deficiency processing), the server 810 confirms the number of lines and the file size of the auditing-related program sent back from each of the servers 802, 804, 806, and 808. The server 810 compares the number of lines and the file size of its auditing-related program with the number of lines and the file size of the auditing-related program of each of the other servers, and specifies the server 804 having the auditing-related program in which differences are produced as a server suspected of being altered. The server 810 fires a program alteration handling request to those servers except the server 804 that may be altered, of the servers 802, 804, 806, and 808. The server 810 stops the alive/dead monitoring program, the resource monitoring program, and the alteration monitoring program (step 2).

The server 802 having received the program alteration handling request in step 2 requests comparative confirmation of the number of lines and the file size of the auditing-related program for each of the servers 804, 806, 808, and 810 (step 3). If there is no server that may be altered, the server 802 returns rejection of the program alteration handling work to the server 810. If a server that may be altered is found, the server 802 returns approval of the program alteration handling work and the name of the found server to the request-source server 810.

The request-source server 810 adds up the responses from the request-destination servers 802, 806, and 808 (step 4). An addition target of this addition is only the server 804 that may be altered and is found by the request-source server 810. If the addition result is rejection by majority decision, the request-source server 810 cancels the program alteration handling work, handles this event as a detection error, and resumes the alive/dead monitoring program, the resource monitoring program, and the alteration monitoring program. If the addition result is adoption by majority decision, the request-source server 810 starts the program alteration handling work.

The program alteration handling work in step 5 is performed by the following procedure.

(1) The request-source server 810 disconnects the specified server 804 that may be altered from the blockchain, and deletes it. The request-source server 810 adds, to the validity certification ledger 816, a block containing the disconnection time, the number of constituent servers, the name of the disconnected server, the reason (=alteration detection), and the state (=abnormal).

(2) The request-source server 810 generates a duplicate of its own (the server 810), and sets the server name of a generated server 844 as the server name of the deleted server 804.

(3) When the server duplication is complete, the request-source server 810 causes the generated server 844 to take part in the blockchain network. The request-source server 810 adds, to the validity certification ledger 816, a block containing the recovery time, the number of constituent servers, the generated server name (=disconnected server name), the reason (=recovery completion), and the state (=abnormal).

(4) The request-source server 810 resumes the alive/dead monitoring program, the resource monitoring program, and the alteration monitoring program from a time closest to the current time.

Figure 22A:
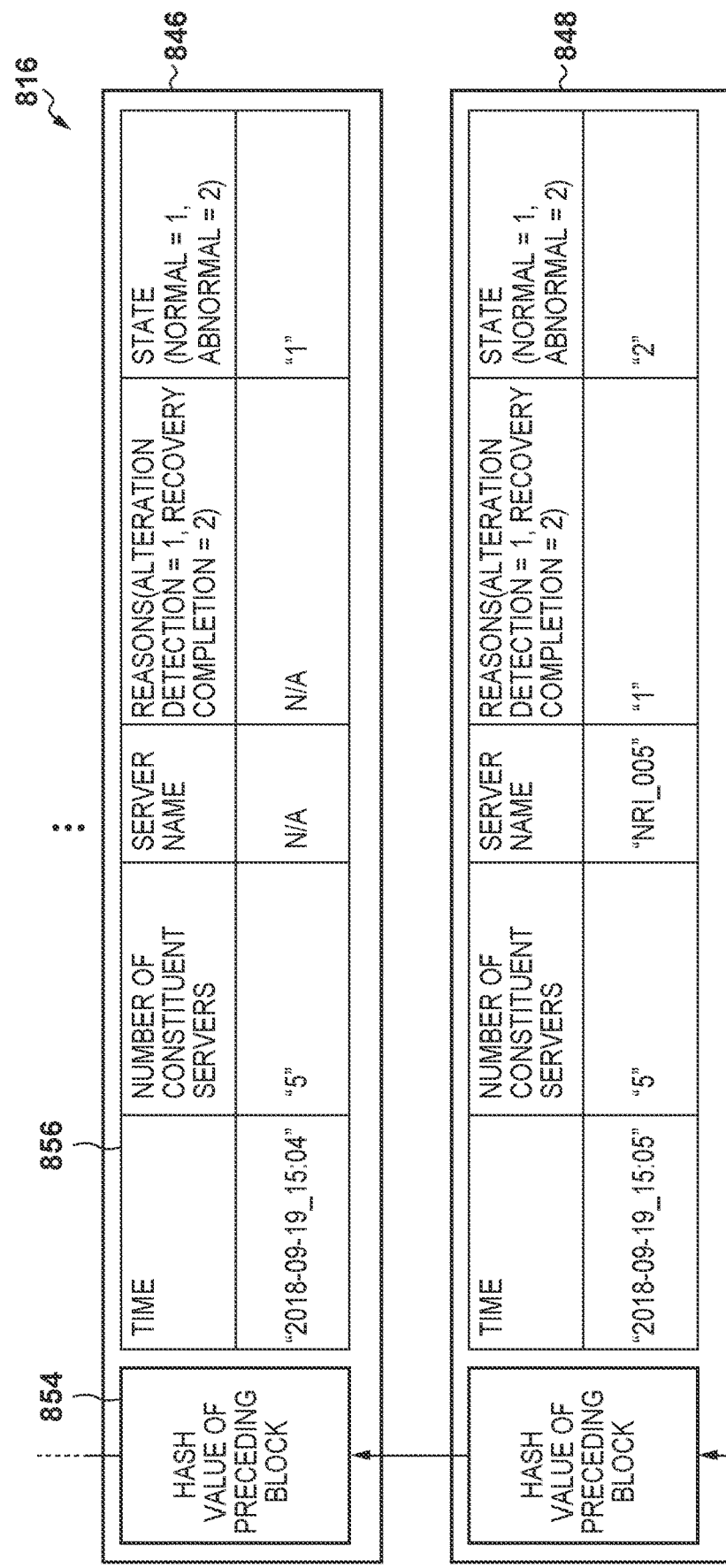
FIG. 22A is a data structure view showing an example of a validity certification ledger shown in FIG. 15.
Figure 22B:
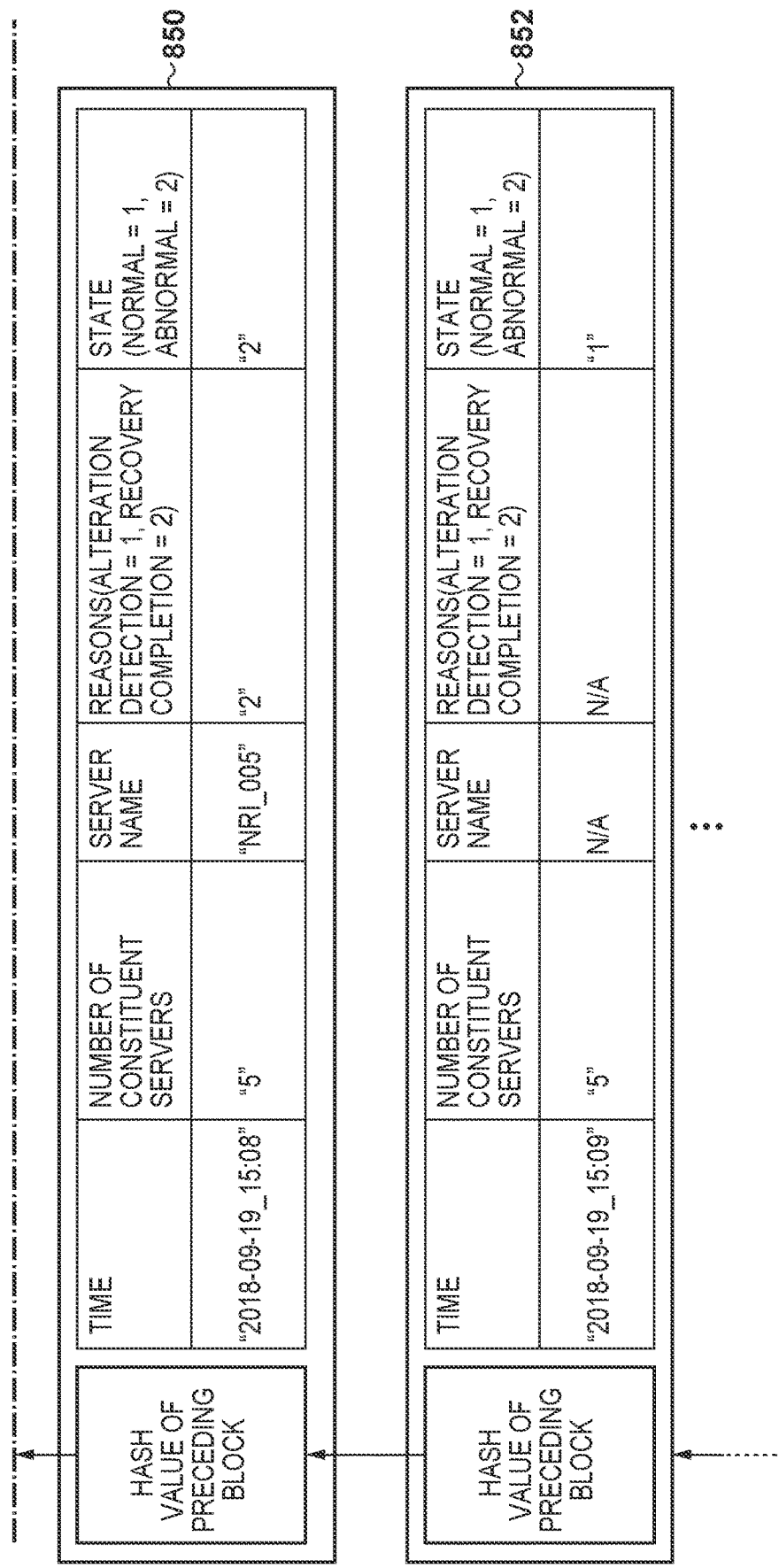
FIG. 22B is a data structure view showing the example of the validity certification ledger shown in FIG. 15.

FIGS. 22A and 22B are data structure views showing an example of the validity certification ledger 816 shown in FIG. 15. The validity certification ledger 816 holds blocks of the blockchain. A plurality of blocks 846, 848, 850, and 852 arranged in a time-series manner from a genesis block (not shown) are held in the validity certification ledger 816. The block 846 contains a hash value 854 of the preceding block, and status data 856 indicating the status of an auditing-related program. Other blocks also have the same arrangement.

The auditing system 800 according to this embodiment has the operation certification ledger 814 and the validity certification ledger 816 in addition to the auditing ledger 812, and hence can certify its normal operation record and the validity of an auditing-related program by an unalterable blockchain. Furthermore, since the server of an auditor participates in the blockchain, it is possible to share the operation certification ledger 814 and the validity certification ledger 816 with the auditor. Accordingly, the auditor can check the operation certification ledger 814 and the validity certification ledger 816 any time, so the efficiency of auditing can be increased.

The arrangements and operations of the systems according to the embodiments have been explained above. These embodiments are merely examples, and it is to be understood by those skilled in the art that combinations of the constituent elements and processes have various modifications, and the scope of the present invention includes these modifications.

In the first embodiment, the case in which the hash value of a business program is inspected while the program is moved from the development-side area 38 to the production-side area 40 has been explained. However, the present invention is not limited to this. For example, the hash value can be inspected when generating the approval screen, and can also be inspected after release is complete.

The case in which a business program is developed and released has been explained in the first embodiment, but the present invention is not limited to this, and the program can be any arbitrary program and can also be a program module.

In the first and second embodiments, a blockchain in which a block holds the hash value of the preceding block has been explained. However, the present invention is not limited to this, and it is also possible to use another type of a blockchain such as a blockchain in which a block holds the hash value of a part of the preceding block.

In the second embodiment, the case in which the operation certification and the validity certification of an auditing-related program of the auditing system 800 are performed by using a blockchain has been explained. However, the present invention is not limited to this. That is, the technical concept according to the second embodiment is also applicable to arbitrary systems using a blockchain, for example, a (virtual) cryptograph passing system and traceability system using a blockchain, and a system that manages business workflows of general paperwork by using a blockchain.

The technical concept of the second embodiment may also be introduced to the librarian system 100 of the first embodiment. In this modification, the librarian system 100 includes a ledger corresponding to the operation certification ledger 814 and a ledger corresponding to the validity certification ledger 816, in addition to the ledger holding unit 130.

The present invention is not limited to the above embodiments, and various changes and modifications can be made without departing from the spirit and scope of the invention. Therefore, to apprise the public of the scope of the present invention, the following claims are appended.

This application claims the benefit of Japanese Patent Application No. 2019-112105, filed Jun. 17, 2019, which is hereby incorporated by reference herein in its entirety.

The invention claimed is:

1. A system, having executable instructions stored in one or more memories, for managing release of a developed program to a production environment, comprising:
   a plurality of servers in which a blockchain is installed;
   means for detecting an event related to release of a program; and
   means for generating a block of the blockchain, which contains uniqueness information that assures uniqueness of the program when the event was detected, and specification information that specifies the detected event,
   wherein the developed program is released by being transferred from a first storage area to which a developer can access to a second storage area to which access is restricted, and further transferred from the second storage area to a third storage area of a production environment, and
   the event to be detected includes approval of a program held in the first storage area, automatic movement of a program from the first storage area to the second storage area, and movement of a program from the second storage area to the third storage area.

2. The system according to claim 1, wherein
   the block of the blockchain further contains information that specifies a subject of an event, a time at which the event occurred, a position of the program when the event was detected, and a path of the program when the event was detected, and
   the position of the program is one of the first storage area, the second storage area, and the third storage area.

3. The system according to claim 1, further comprising:
   means for specifying a program that is approved but is not moved, by referring to the specification information contained in the block of the blockchain; and
   means for automatically moving the specified program from the first storage area to the second storage area.

4. The system according to claim 3, wherein when the specification information is information that specifies approval of a program held in the first storage area, the specifying means compares uniqueness information of the program, which is contained in the block of the blockchain, with current uniqueness information of the program, specifies the program if the two pieces of uniqueness information match, and performs a warning process without specifying the program if the two pieces of uniqueness information do not match.

5. The system according to claim 1, further comprising means for generating a screen that displays an event having occurred for a predetermined program and uniqueness information obtained when the event was detected, in association with each other, by referring to the block of the blockchain, and displaying the generated screen on a display.

6. The system according to claim 1, wherein
   the plurality of servers include a server of an auditing subject, and
   the system further comprises means for generating a screen that displays statistical information of release of a program, by referring to the block of the blockchain, and displaying the screen on a display of the server of the auditing subject.

* * * * *